(12) United States Patent
Chan

(10) Patent No.: US 7,576,587 B2
(45) Date of Patent: Aug. 18, 2009

(54) ON-CHIP SOURCE TERMINATION IN COMMUNICATION SYSTEMS

(75) Inventor: Kevin Tunghai Chan, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/980,541

(22) Filed: Oct. 31, 2007

(65) Prior Publication Data

US 2008/0129332 A1 Jun. 5, 2008

Related U.S. Application Data

(62) Division of application No. 11/115,117, filed on Apr. 27, 2005, now Pat. No. 7,301,365.

(51) Int. Cl.
*H03K 17/16* (2006.01)
*H03K 17/30* (2006.01)
(52) U.S. Cl. .................... 327/379; 327/109; 327/391; 330/51; 330/307
(58) Field of Classification Search ......... 327/108–109, 327/112, 379, 391; 330/51, 307
See application file for complete search history.

(56) References Cited

U.S. PATENT DOCUMENTS

| | | | | |
|---|---|---|---|---|
| 5,355,038 A | * | 10/1994 | Hui | 327/277 |
| 5,493,205 A | * | 2/1996 | Gorecki | 323/315 |
| 5,517,143 A | * | 5/1996 | Gross | 327/108 |
| 5,530,377 A | | 6/1996 | Walls | |
| 5,581,197 A | | 12/1996 | Motley et al. | |
| 5,734,293 A | * | 3/1998 | Gross | 327/561 |
| 6,107,867 A | | 8/2000 | Lakshmikumar | |
| 6,125,415 A | | 9/2000 | Liu | |
| 6,259,745 B1 | | 7/2001 | Chan | |

(Continued)

FOREIGN PATENT DOCUMENTS

CN 1128927 A 8/1996

(Continued)

OTHER PUBLICATIONS

European Search Report cited in Application No. 06003637.3-2215, on Sep. 28, 2006.

*Primary Examiner*—Vibol Tan
*Assistant Examiner*—Jason Crawford
(74) *Attorney, Agent, or Firm*—Sterne, Kessler, Goldstein & Fox P.L.L.C.

(57) ABSTRACT

A communication system includes an integrated circuit (IC) die having an on-chip source termination. The on-chip source termination can be a non-precision resistor, such as an unsilicided poly resistor, or any other suitable termination. As compared to an off-chip source termination, the on-chip source termination can reduce voltage peaking and/or voltage overshoot in the IC die and/or at a load that is connected to the IC die. The IC die can further include a line driver to provide a source current. A bias generator can be included to provide a bias current to the line driver. The bias generator can include a first current source coupled to an off-chip resistor and a second current source coupled to an on-chip resistor. An output voltage of the IC die can be adjusted by manipulating a trim control of the off-chip resistor and/or a trim control of the on-chip resistor.

12 Claims, 18 Drawing Sheets

U.S. PATENT DOCUMENTS

| | | | |
|---|---|---|---|
| 6,490,325 B1 | 12/2002 | Fiedler et al. | |
| 6,504,397 B1 | 1/2003 | Hart et al. | |
| 6,559,692 B2 * | 5/2003 | Kimball et al. | 327/109 |
| 6,566,904 B2 | 5/2003 | Van Bavel et al. | |
| 6,633,189 B1 * | 10/2003 | Gradinariu et al. | 327/262 |
| 7,061,273 B2 | 6/2006 | Wang et al. | |
| 2003/0020518 A1 | 1/2003 | Bavel et al. | |
| 2004/0080339 A1 | 4/2004 | Kubo | |
| 2004/0201416 A1 | 10/2004 | Wyers et al. | |
| 2006/0244480 A1 | 11/2006 | Chan | |

FOREIGN PATENT DOCUMENTS

| | | |
|---|---|---|
| EP | 1 050 138 | 11/2000 |
| EP | 1 422 878 A2 | 5/2004 |
| GB | 2 407 721 A | 5/2005 |

* cited by examiner

ON-CHIP SOURCE TERMINATION IN COMMUNICATION SYSTEMS

CROSS REFERENCE TO RELATED APPLICATIONS

This application is a divisional of U.S. application Ser. No. 11/115,117, filed Apr. 27, 2005, which is incorporated by reference herein in its entirety.

BACKGROUND OF THE INVENTION

1. Field of the Invention

The present invention relates generally to communication systems, and more specifically to source termination in communication systems.

2. Background

Devices in a communication system generally include transmitters to transmit information via an electrically conductive medium, such as a transmission line. For instance, a transmitter in a first device can transmit information to a receiver in a second device, and a transmitter in the second device can transmit information to a receiver in the first device. The transmit and receive functions of a device are often combined using a transceiver.

Components of the communication system that are coupled to a transmitter are cumulatively referred to as the load of the transmitter. The load has a load impedance, and the transmitter has a source impedance. The load impedance, and the source impedance are often matched to facilitate the transfer of power from the transmitter to the load.

A source termination can facilitate matching the source impedance and the load impedance and/or absorb reflections on a transmission line to which the source termination is connected. However, conventional source terminations are off-chip in order to achieve precision output voltage amplitudes, greater linearity, and/or higher bandwidth. For example, the source termination is usually a discrete precision resistor coupled to an integrated circuit (IC) chip that includes the transmitter. Parasitics between the chip and the off-chip source termination can cause hybrid residual for bi-directional communication systems. Off-chip source terminations can cause voltage peaking or voltage overshoot inside the transmitter and/or at the load. The return loss performance of off-chip source terminations degrades substantially at higher frequencies. For instance, the return loss associated with an off-chip source termination can be less than 5 dB at frequencies greater than approximately 400 MHz.

What is needed, then, is a source termination that addresses one or more of the aforementioned shortcomings of conventional source terminations.

BRIEF SUMMARY OF THE INVENTION

The present invention provides an integrated circuit (IC) chip that includes an on-chip source termination. The on-chip source termination can be a non-precision resistor, such as an unsilicided poly resistor, or any other suitable termination. The on-chip source termination can facilitate matching a source impedance of the IC chip and a load impedance of a load connected to the IC chip. The on-chip source termination can absorb reflections on a transmission line to which the IC chip is connected. As compared to an off-chip source termination, the on-chip source termination can reduce voltage peaking and/or voltage overshoot in the IC die and/or at the load that is connected to the IC chip.

According to an embodiment, the IC chip further includes a line driver coupled to the on-chip source termination to provide a source current. A bias generator can provide a bias current to the line driver. For instance, the source current can be based on the bias current.

In another embodiment, the bias generator combines a first current based on an off-chip resistor and a second current based on an on-chip resistor to provide the bias current. The bias generator includes a first current source coupled to the off-chip resistor and a second current source coupled to the on-chip resistor. The first current source amplifies a current that flows through the off-chip resistor to provide the first current. The first current source can have a first adjustable current gain. The second current source amplifies a current that flows through the on-chip resistor to provide the second current. The second current source can have a second adjustable current gain.

The first current source can include a first transistor capable of manipulating the current that flows through the off-chip resistor. The second current source can include a second transistor capable of manipulating the current that flows through the on-chip resistor. The bias generator can further include a first operational amplifier to control the first transistor and a second operational amplifier to control the second transistor. For example, the first operational amplifier can be in a feedback of the first transistor, and the second operational amplifier can be in a feedback of the second transistor.

According to yet another embodiment, the IC chip has an output voltage in accordance with equation $V_{OUT} = K \cdot M \cdot \beta_{EXT} \cdot V_{REF} = K \cdot N \cdot \beta_{INT} \cdot V_{REF}$. Referring to the equation, K is a current gain of the line driver, M is a current gain of the first current source, and N is a current gain of the second current source. $\beta_{EXT}$ equals a resistance of the load divided by a resistance of the off-chip resistor. $\beta_{INT}$ equals a resistance of the on-chip source termination divided by a resistance of the on-chip resistor. $V_{REF}$ is a reference voltage provided to the first operational amplifier and the second operational amplifier.

In still another embodiment, the IC chip is an Ethernet transmitter. For example, the IC chip can be capable of operating at a frequency of at least 125 megahertz. In another example, the IC chip can be capable of operating at a frequency of at least one gigahertz. The IC chip can have a return loss that satisfies a return loss requirement of IEEE Std. 802.3ab and/or proposed IEEE Std. 802.3an. Information relating to proposed IEEE Std. 802.3 can be found at http://www.ieee802.org/3/an/index.html.

According to an embodiment, a method of adjusting the output voltage of the IC chip includes adjusting a trim control of the on-chip resistor and/or a trim control of the off-chip resistor. The load may be disconnected from the IC chip, and/or the first current source may be disabled. The trim control of the on-chip resistor can be adjusted to set the output voltage of the IC chip. For example, the trim control of the on-chip resistor can be adjusted in response to disconnecting the load and/or disabling the first current source. The first current source can be disabled by setting the second trim control to approximately zero and/or disconnecting the off-chip resistor from the IC chip.

The load is connected to the IC chip, and the first current source is enabled. The trim control of the off-chip resistor is adjusted to set the output voltage of the IC chip in response to connecting the load and enabling the first current source. The trim control of the on-chip resistor and the trim control of the off-chip resistor can be adjusted proportionally in response to adjusting the trim control of the off-chip resistor to set the output voltage.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Although the embodiments of the invention described herein refer specifically, and by way of example, to Ethernet systems, including Ethernet transmitters, it will be readily apparent to persons skilled in the relevant art(s) that the invention is equally applicable to other communication systems, including but not limited to serializer/deserializer (SerDes) systems, optical systems, cable systems, digital subscriber line (DSL) systems, and/or any combination thereof. An Ethernet transmitter can be an Ethernet transceiver, for example. It will also be readily apparent to persons skilled in the relevant art(s) that the invention is applicable to any communication system requiring an accurate transmit voltage.

1.0 Integrated Circuit (IC) Package

Figure 1:
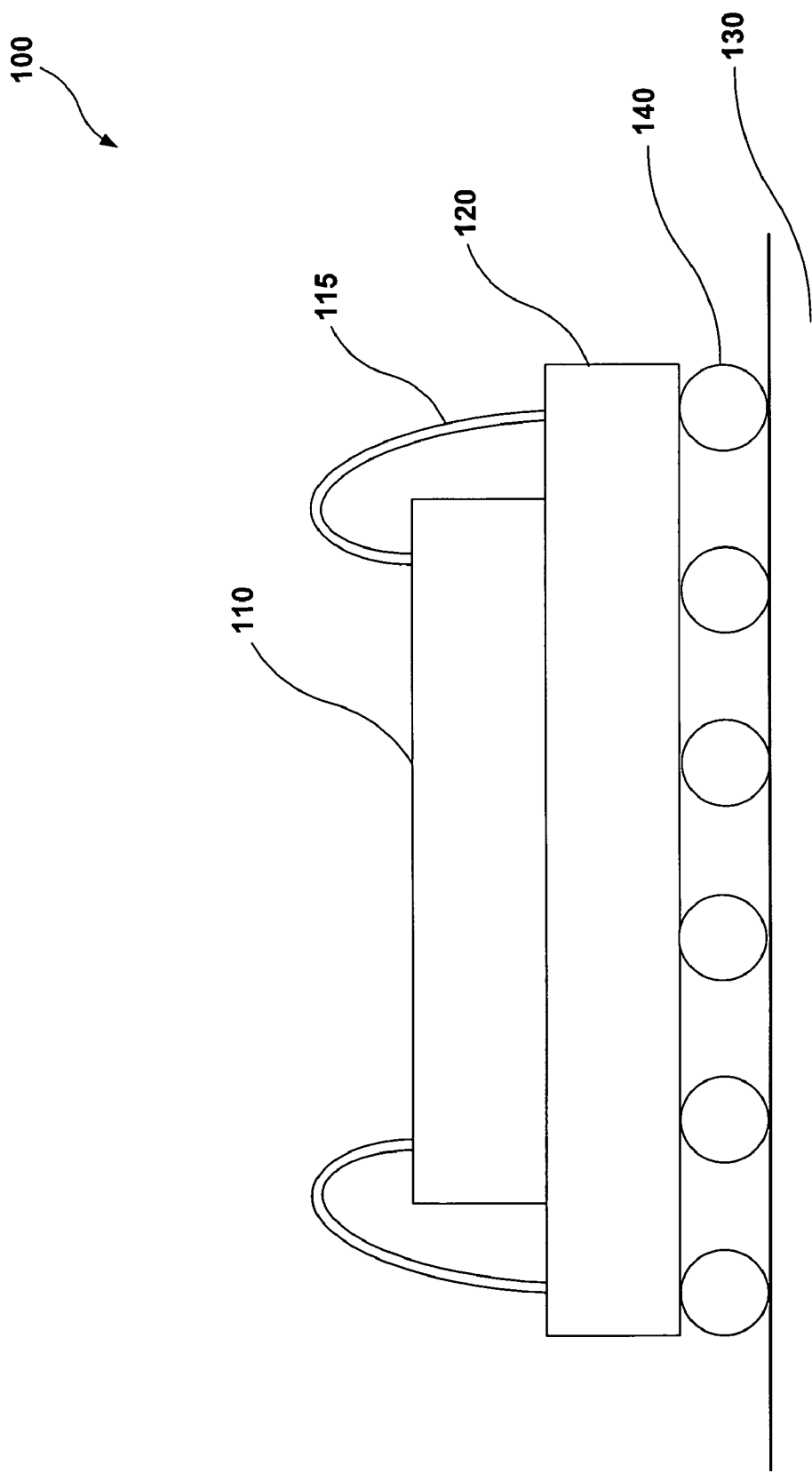
FIG. 1 illustrates an integrated circuit (IC) package according to an embodiment of the present invention.

FIG. 1 illustrates an integrated circuit (IC) package 100 according to an embodiment of the present invention. The IC package 100 includes an IC die 110, bond wires 115, and a substrate 120. IC die 110 can be coupled to substrate 120 via an adhesive, such as epoxy. Bond wires 115 electrically connect IC die 110 to substrate 120. For instance, bond wires 115 can be coupled between one or more bond pads at a surface of IC die 110 and one or more bond pads at a surface of substrate 120. Substrate 120 can be of any suitable type, including but not limited to Bismalemide Triazine (BT), ceramic, FR4, glass, organic, plastic, tape (flex), and Teflon. In FIG. 1, substrate 120 is coupled to a printed wire board (PWB) 130 via solder balls 140 for illustrative purposes.

Figure 2:
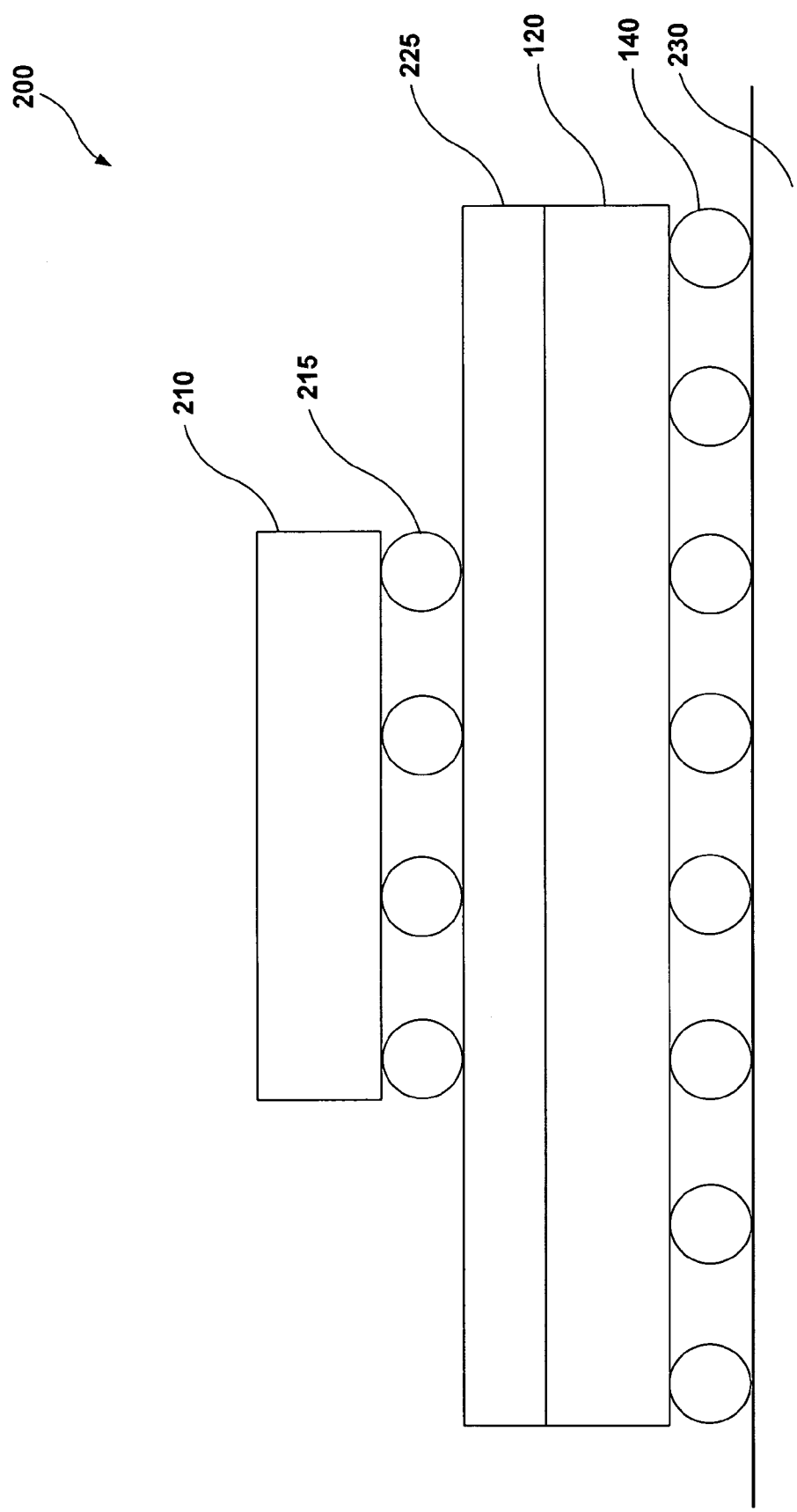
FIG. 2 illustrates a flip chip IC package according to another embodiment of the present invention.

FIG. 2 illustrates a flip chip IC package 200 according to another embodiment of the present invention. Flip chip IC package 200 includes a flip chip IC die 210 coupled via solder bumps 215 to a stiffener 225. Stiffener 225 is coupled to substrate 120 to provide structural support, though the scope of the invention is not limited in this respect. For instance, stiffener 225 may not be needed to support substrate 120. In FIG. 2, substrate 120 is coupled to a printed circuit board (PCB) 230 via solder balls 140 for illustrative purposes.

2.0 Source Termination

Figure 3:
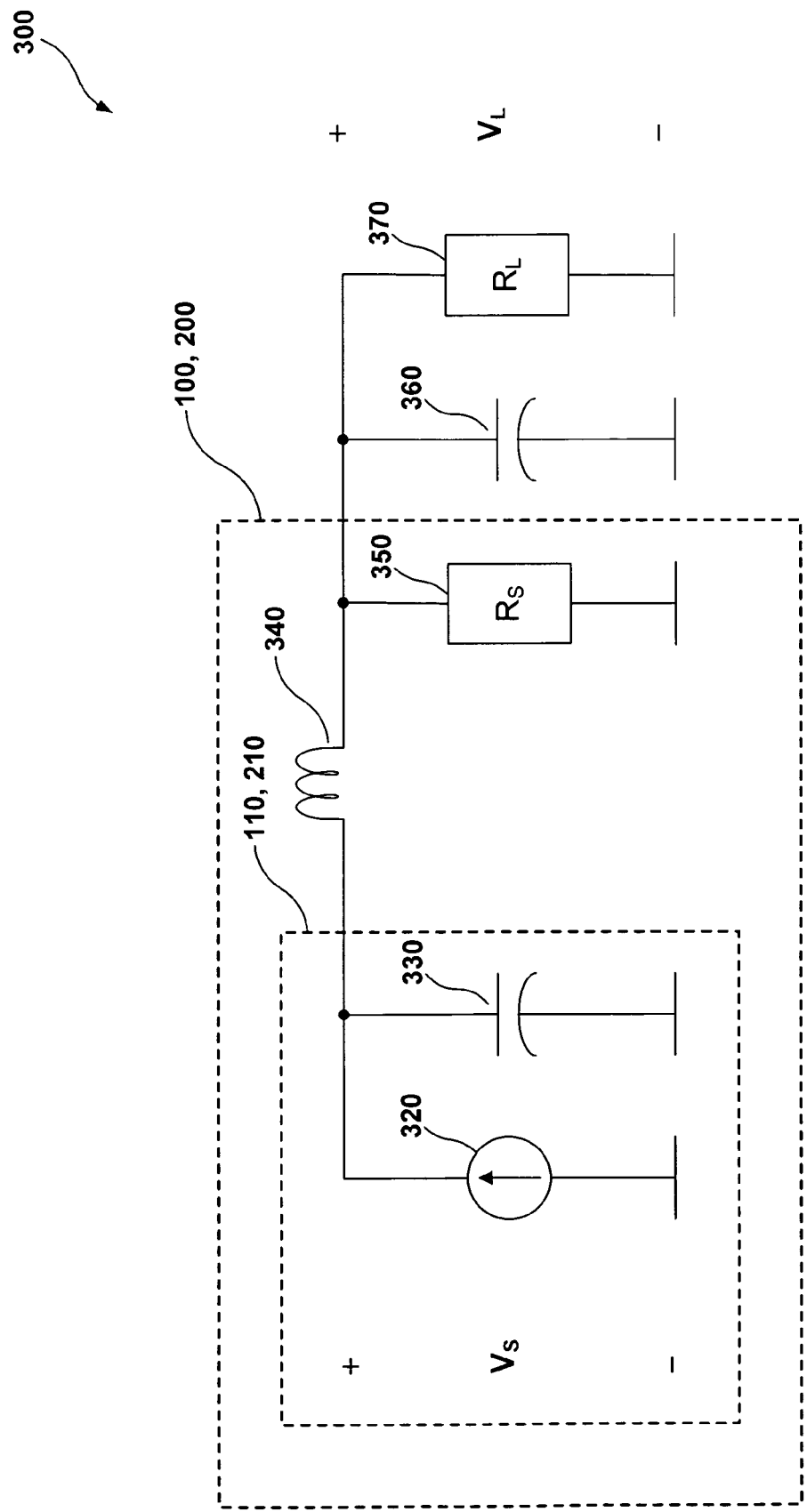
FIG. 3 is a schematic representation of a communication system including a conventional off-chip source termination.

FIG. 3 is a schematic representation of a communication system 300 including a conventional off-chip source termination ($R_S$) 350. Communication system 300 further includes IC die 110, 210 having a line driver 320 coupled in parallel with a capacitor 330 for illustrative purposes. Line driver 320 generates a source current. Capacitor 330 represents the parasitic capacitance (e.g., 7 pF) associated with IC die 110, 210.

In the embodiment of FIG. 3, an inductor 340 is coupled between line driver 320 and off-chip source termination 350. Inductor 340 represents the parasitic inductance (e.g., 7 nH) associated with IC package 100, 200. The parasitic inductance can include the inductance associated with bond wires 115 of IC package 100 in FIG. 1 or the inductance associated with solder bumps 215 of IC package 200 in FIG. 2, to provide some examples.

Off-chip source termination 350 is coupled in parallel with capacitor 360 and a load 370 for illustrative purposes. Capacitor 360 represents the parasitic capacitance (e.g., 1 pF) associated with the board to which IC package 100, 200 is coupled. Capacitor 360 can represent the parasitic capacitance associated with PWB 130 in FIG. 1 or PCB 230 in FIG. 2, to provide some examples.

The resistance of off-chip source termination 350 and the resistance of load 370 can be approximately the same. For instance, off-chip source termination 350 and load 370 can each have a resistance of 50Ω or 100Ω, to provide some examples. Off-chip source termination 350 and load 370 can have any suitable resistance, and the resistance of each need not necessarily be the same. The voltage across load 370 ($V_L$), also referred to as the transmit voltage or the output voltage ($V_{OUT}$), is based on the resistance of off-chip source termination 350. $V_L$ is proportional to the source current generated by line driver 320.

Figure 4:
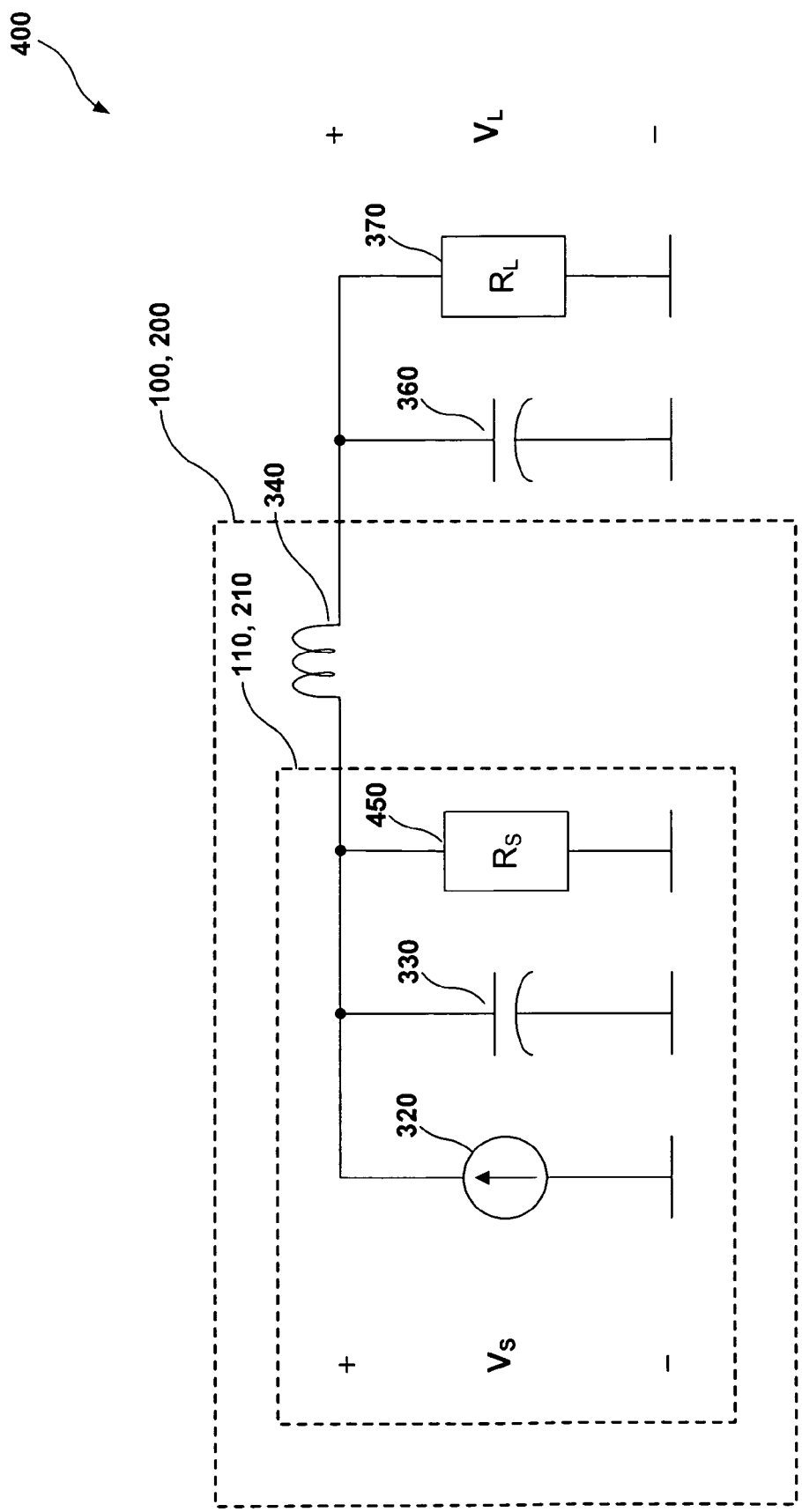
FIG. 4 is a schematic representation of a communication system including an on-chip source termination according to an embodiment of the present invention.

FIG. 4 is a schematic representation of a communication system 400 including an on-chip source termination ($R_S$) 450 according to an embodiment of the present invention. On-chip source termination 450 can be a non-precision resistor, such as an unsilicided poly resistor, though the scope of the present invention is not limited in this respect. On-chip source termination 450 can be any suitable termination. In contrast to off-chip source termination 350 shown in FIG. 3, on-chip source termination 450 in FIG. 4 is included in IC die 110, 210. On-chip source termination 450 is coupled in parallel with line driver 320 and capacitor 330 for illustrative purposes. In the embodiment of FIG. 4, inductor 340 is coupled between on-chip source termination 450 and load 370.

2.1 On-Chip v. Off-Chip Source Termination

Figure 5:
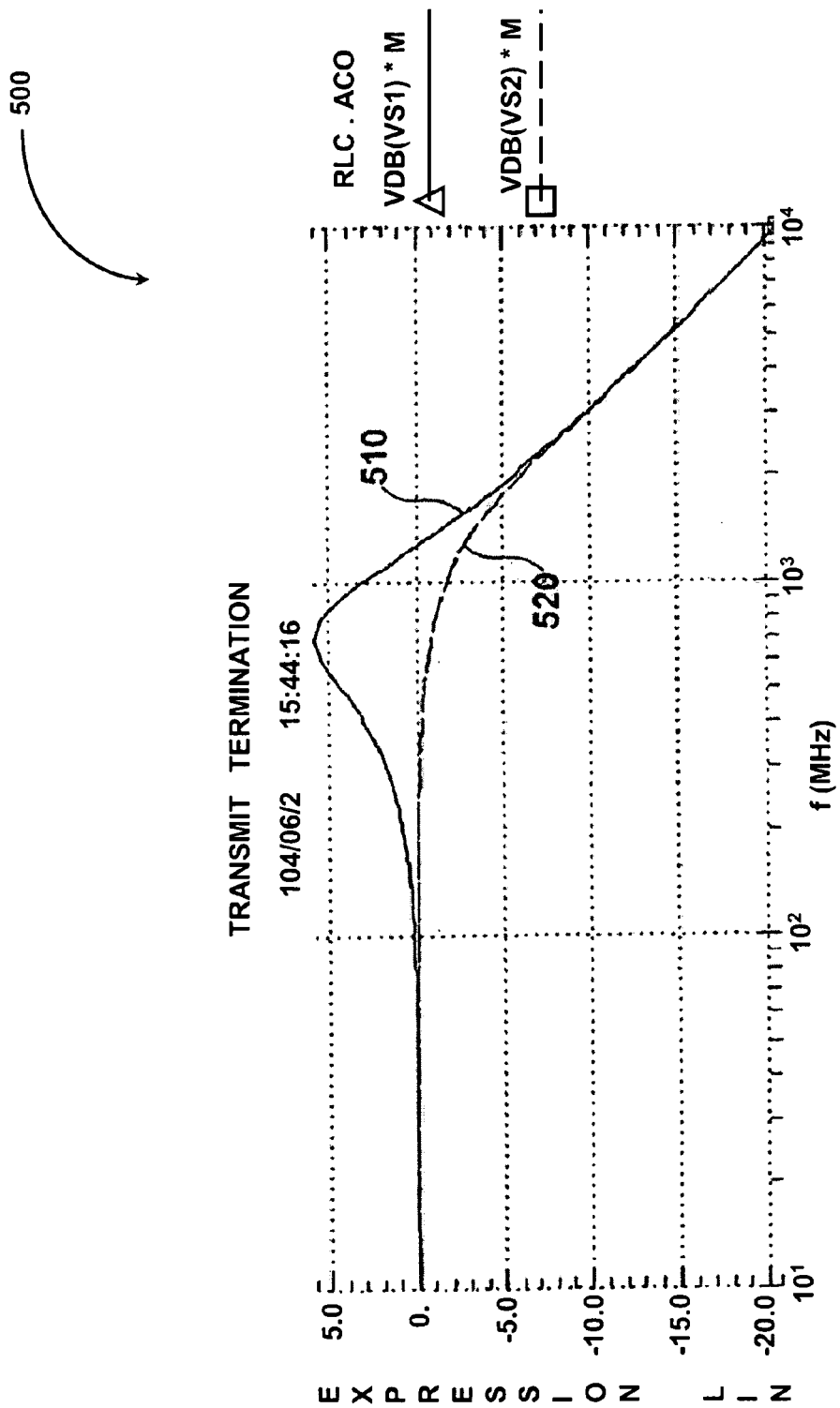
FIG. 5 illustrates a graphical comparison of a first exemplary alternating current (AC) frequency response in the IC die of the communication system shown in FIG. 3 and a second exemplary AC frequency response in the IC die of the communication system shown in FIG. 4 according to an embodiment of the present invention.
Figure 6:
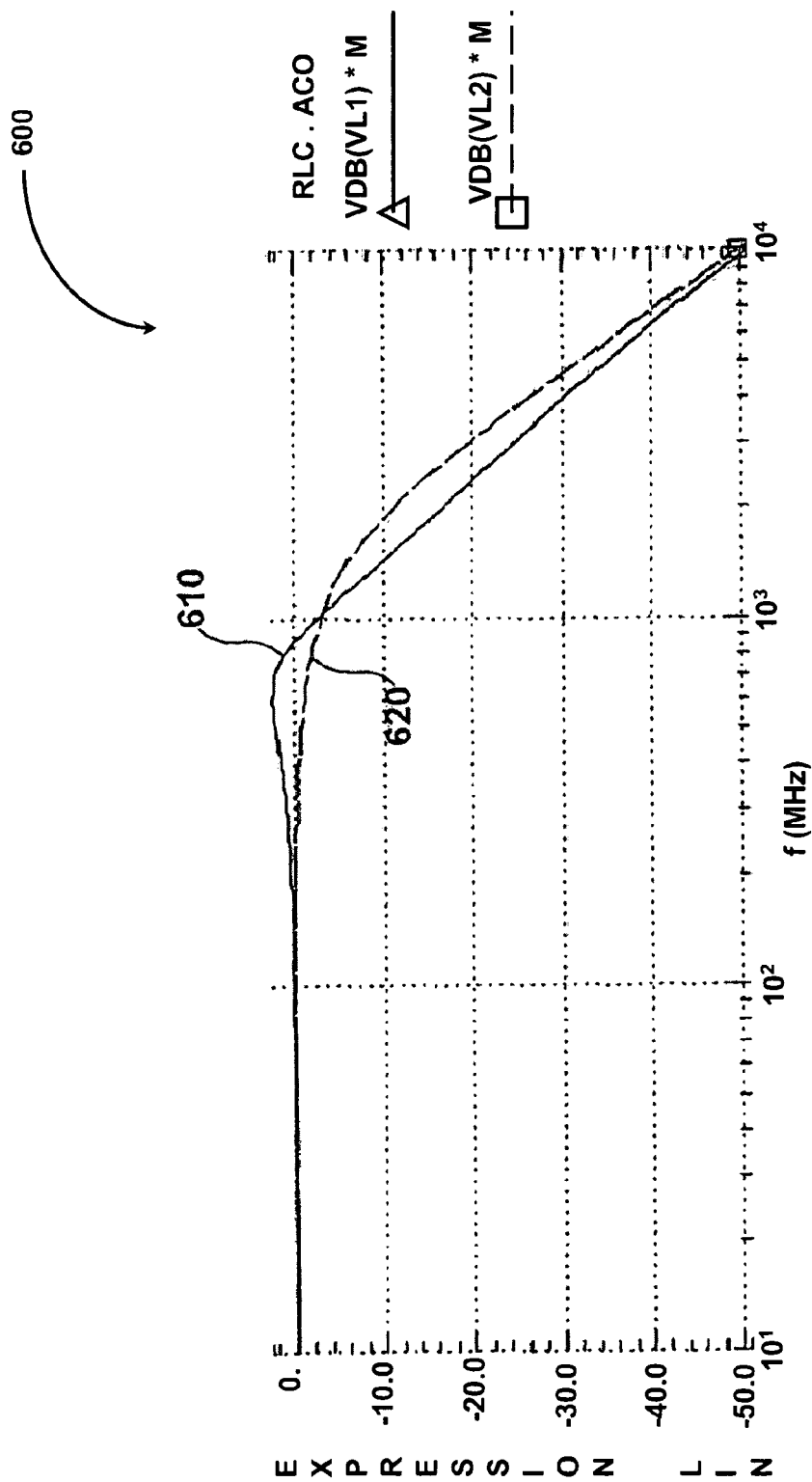
FIG. 6 illustrates a graphical comparison of a third exemplary AC frequency response at the load of the communication system shown in FIG. 3 and a fourth exemplary AC frequency response at the load of the communication system shown in FIG. 4 according to an embodiment of the present invention.
Figure 7:
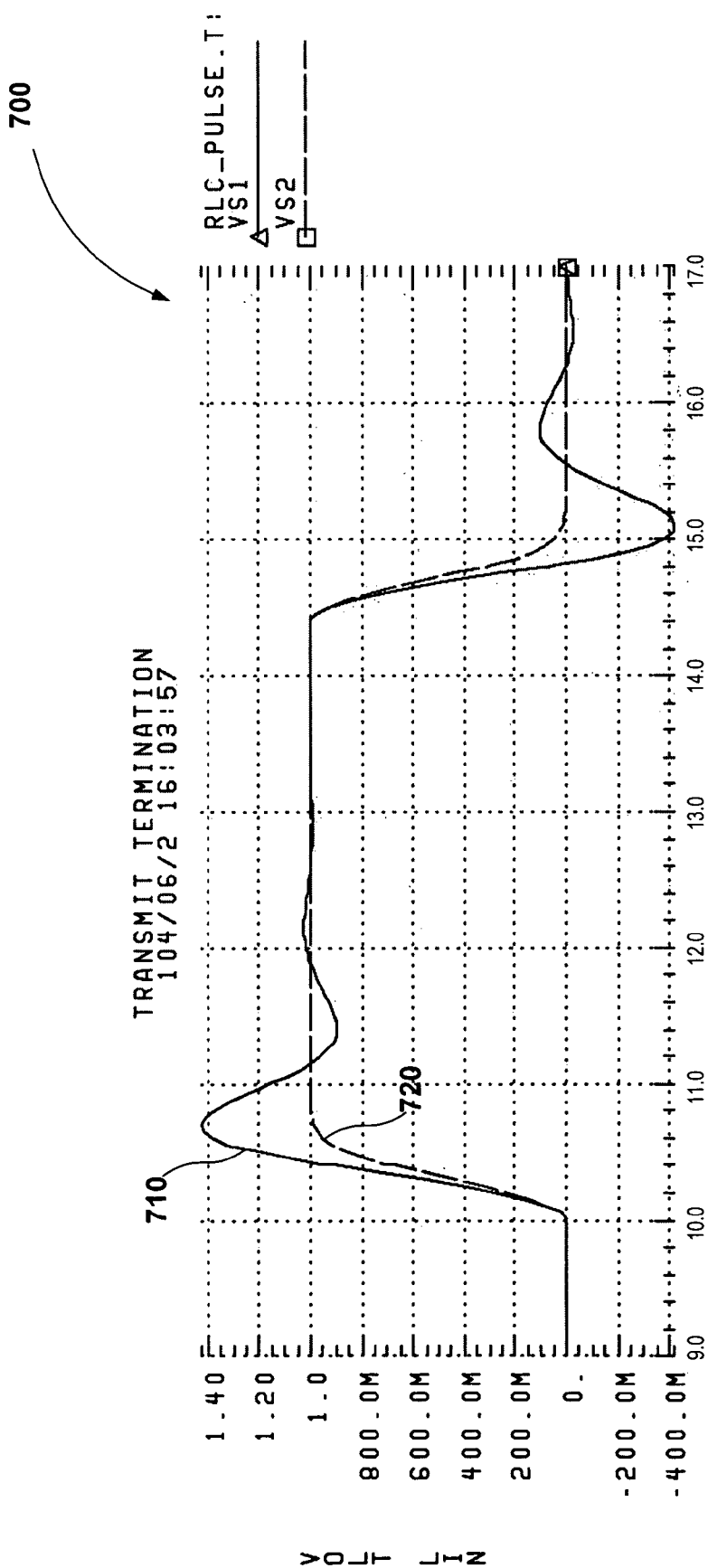
FIG. 7 illustrates a graphical comparison of a first step response in the IC die of the communication system shown in FIG. 3 and a second exemplary step response in the IC die of the communication system shown in FIG. 4 according to an embodiment of the present invention.
Figure 8:
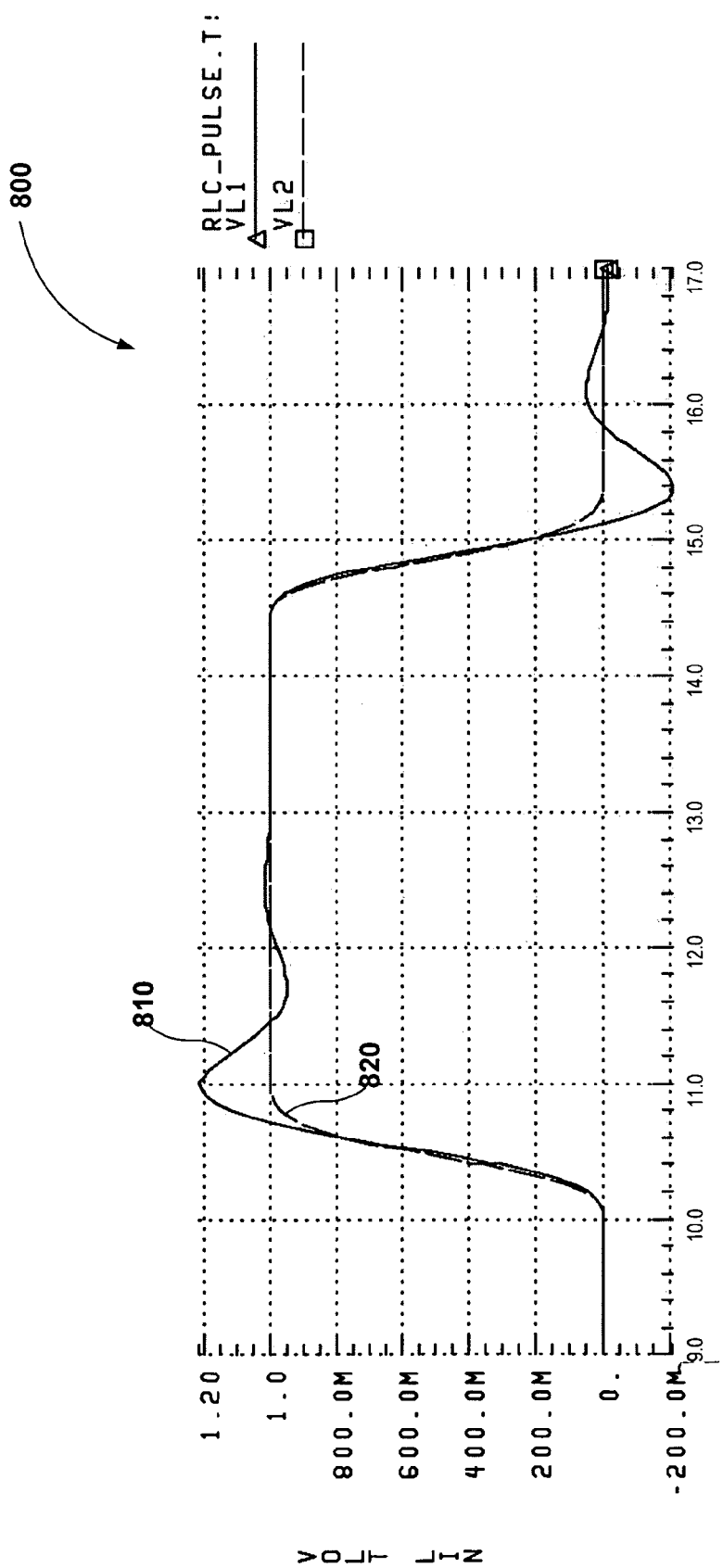
FIG. 8 illustrates a graphical comparison of a third exemplary step response at the load of the communication system shown in FIG. 3 and a fourth exemplary step response at the load of the communication system shown in FIG. 4 according to an embodiment of the present invention.

Referring to FIGS. 5-8, on-chip source termination 450 of communication system 400 can reduce voltage peaking and/or voltage overshoot, as compared to off-chip source termination 350 of communication system 300. FIGS. 5 and 7 illustrate that on-chip source termination 450 can reduce voltage peaking and/or voltage overshoot in IC die 110, 210. FIGS. 6 and 8 illustrate that on-chip source termination 450 can reduce voltage peaking and/or voltage overshoot at load 370. According to an embodiment, communication system 400 including on-chip source termination 450 has substantially no voltage peaking and/or voltage overshoot.

FIG. 5 illustrates a graphical comparison 500 of a first exemplary alternating current (AC) frequency response 510 in IC die 110, 210 of communication system 300 shown in FIG. 3 and a second exemplary AC frequency response 520 in IC die 110, 210 of communication system 400 shown in FIG. 4 according to an embodiment of the present invention. Graphical comparison 500 shows a semi-logarithmic plot of a voltage inside IC die 110, 210 of communication systems 300 and 400 in units of mVdB over a range of frequencies from 10 MHz to 10 GHz. Referring to FIG. 5, first AC frequency response 510 peaks more than 6 mVdB at approximately 900 MHz, as compared to second AC frequency response 520.

FIG. 6 illustrates a graphical comparison 600 of a third exemplary AC frequency response 610 at load 370 of communication system 300 shown in FIG. 3 and a fourth exemplary AC frequency response 620 at load 370 of communication system 400 shown in FIG. 4 according to an embodiment of the present invention. Graphical comparison 600 shows a semi-logarithmic plot of the load voltages ($V_L$) of communication systems 300 and 400 in units of mVdB over a range of frequencies from 10 MHz to 10 GHz. In FIG. 6, third AC frequency response 610 peaks about 2 mVdB at approximately 900 MHz, as compared to fourth AC frequency response 620.

FIG. 7 illustrates a graphical comparison 700 of a first exemplary step response 710 in IC die 110, 210 of communication system 300 shown in FIG. 3 and a second exemplary step response 720 in IC die 110, 210 of communication system 400 shown in FIG. 4 according to an embodiment of the present invention. Graphical comparison 700 shows a Cartesian plot of a voltage inside IC die 110, 210 of communication systems 300 and 400 in units of V over a time period from 9.0 ns to 17.0 ns.

In FIG. 7, first step response 710 peaks approximately 400 mV at both its rising and falling edges, as compared to second step response 720. In other words, first step response 710 has approximately 40% voltage overshoot, as compared to second step response 720.

FIG. 8 illustrates a graphical comparison 800 of a third exemplary step response 810 at load 370 of communication system 300 shown in FIG. 3 and a fourth exemplary step response 820 at load 370 of communication system 400 shown in FIG. 4 according to an embodiment of the present invention.

Referring to FIG. 8, third step response 810 peaks approximately 200 mV at both its rising and falling edges, as compared to fourth step response 820. In other words, third step response 810 has approximately 20% voltage overshoot, as compared to fourth step response 820.

A voltage peak, such as that depicted by first AC frequency response 510 or third AC frequency response 610, or a voltage overshoot, such as that depicted by first step response 710 or third step response 810, can cause a hybrid residual in a bi-directional communication system. A hybrid residual is essentially an error signal. For instance, the hybrid residual can result from an imperfect subtraction of a transmit signal from a composite signal that includes the transmit signal and a receive signal. If the transmit signal is not properly subtracted from the composite signal, the resulting signal can be a combination of the receive signal and the hybrid residual.

Referring back to FIG. 4, communication system 400 can include a circuit to subtract the transmit signal from the composite signal. The hybrid residual may result from an inability of the circuit to adequately predict a voltage peak or a voltage overshoot or to compensate for the voltage peak or the voltage overshoot. For example, the circuit can be an adaptive electronic transmission signal cancellation circuit, as described in U.S. Pat. No. 6,259,745, filed Oct. 29, 1999, which is incorporated herein by reference in its entirety.

Figure 9:
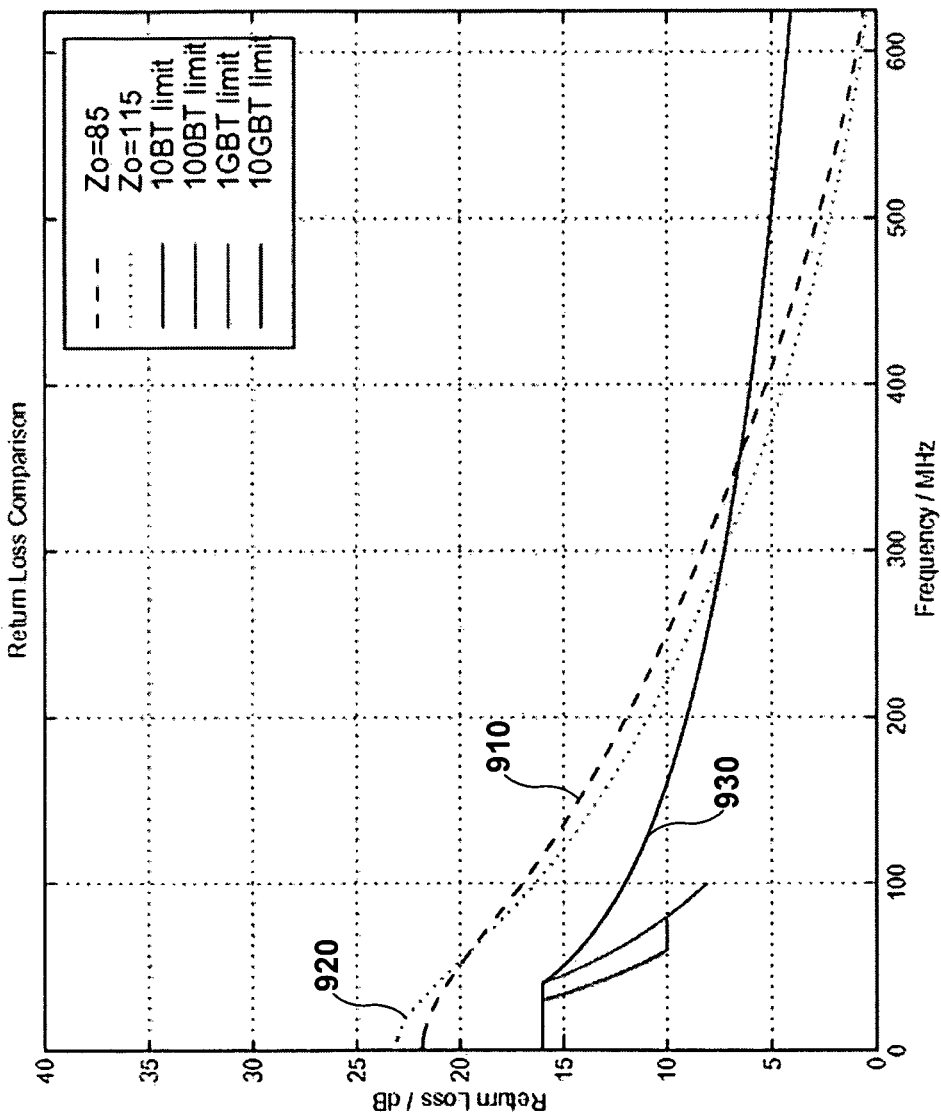
FIG. 9 is a graphical representation of return loss with respect to frequency for the communication system shown in FIG. 3.

FIG. 9 is a graphical representation 900 of return loss with respect to frequency for communication system 300 shown in FIG. 3. The return loss is depicted in units of dB over a frequency range from 0 MHz to more than 600 MHz. Return loss requirements for a variety of technologies are illustrated. The return loss requirements in FIG. 9 correspond to 10 megabit (10 BT), 100 megabit (100 BT), 1 gigabit (1 GBT), and 10 gigabit (10 GBT) Ethernet technologies. A first return loss plot 910 shows the return loss of communication system 300 having a termination impedance ($Z_0$) of 85Ω. A second return loss plot 920 shows the return loss of communication system 300 having a $Z_0$ of 115Ω.

Termination impedances of 85Ω and 115Ω are used for illustrative purpose to indicate that off-chip source termination 350 can have a nominal resistance of 100Ω with a variation of ±15%. The first and second return loss plots 910 and 920 show the return loss of communication system 300 for the off-chip source termination 350 having a variation of −15% and +15%, respectively. Plot 930 represents a return loss requirement for a 10 gigabit Ethernet, also referred to as 10 GHz Ethernet.

Referring to FIG. 9, communication system 300 having off-chip source termination 350 does not pass the 10 gigabit Ethernet return loss requirement inter alia 930 at frequencies greater than approximately 350 MHz.

Figure 10:
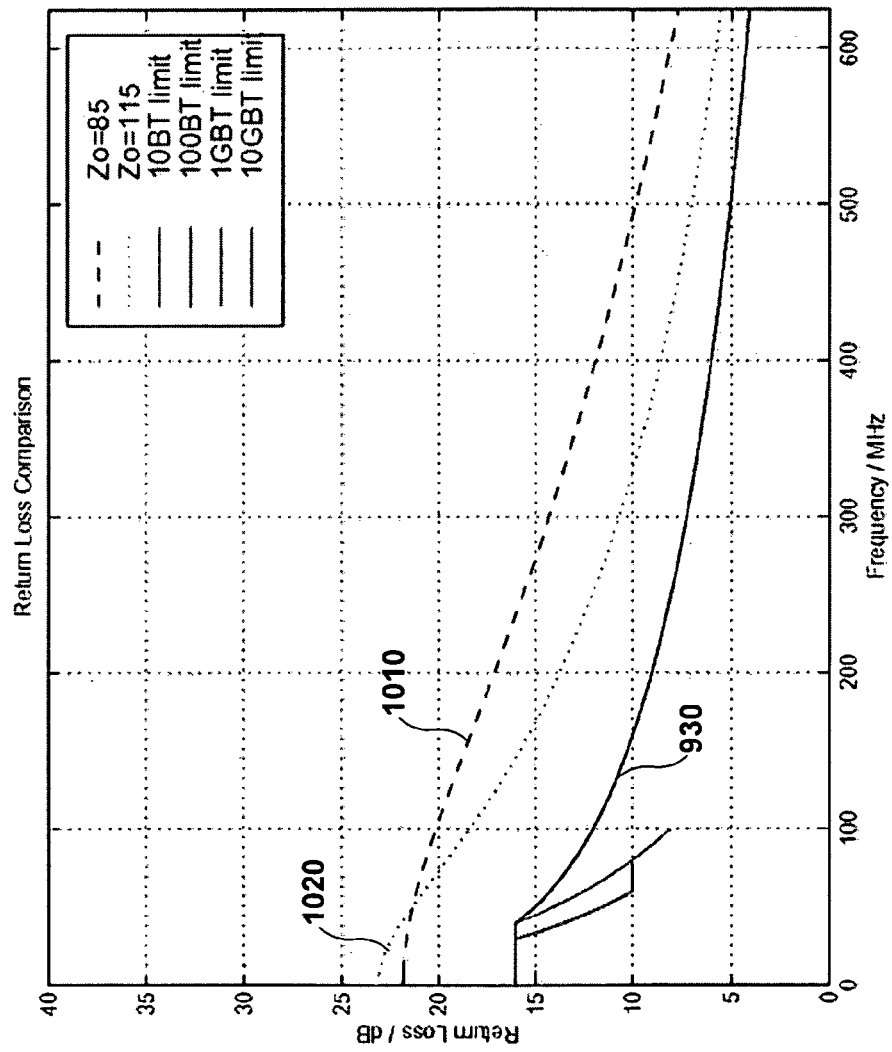
FIG. 10 is a graphical representation of return loss with respect to frequency for the communication system shown in FIG. 4 according to an embodiment of the present invention.

FIG. 10 is a graphical representation 1000 of return loss with respect to frequency for communication system 400 shown in FIG. 4 according to an embodiment of the present invention. In the embodiment of FIG. 10, on-chip source termination 450 is an unsilicided poly resistor having a nominal resistance of 100Ω with a tolerance of ±15%. Thus, the resistance of the unsilicided poly resistor can be any value in the range of 85Ω to 115Ω.

Plots 1010 and 1020 of the return loss of communication system 400 having $Z_0=85\Omega$ and $Z_0=115\Omega$, respectively, are shown, in addition to return loss requirements for 10 GHz Ethernet. In FIG. 10, the return loss of communication system 400 having on-chip source termination 450 with a tolerance of ±15% (i.e., $Z_0=85\Omega$ and $Z_0=115\Omega$) satisfies the 10 GHz Ethernet return loss requirement 930 for frequencies up to at least 600 MHz.

Figure 11:
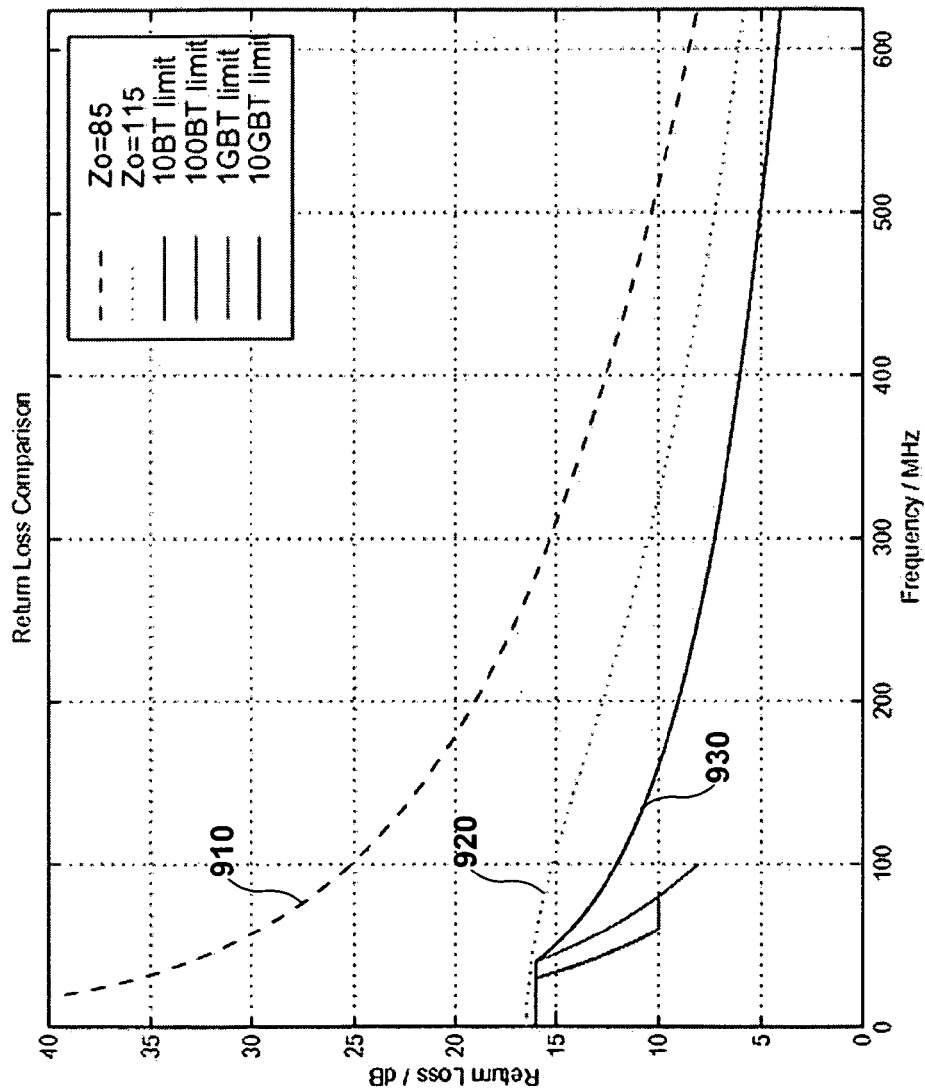
FIG. 11 is a graphical representation of the return loss of the communication system shown in FIG. 4 having an 85Ω untrimmed unsilicided poly termination resistor according to an embodiment of the present invention.
Figure 12:
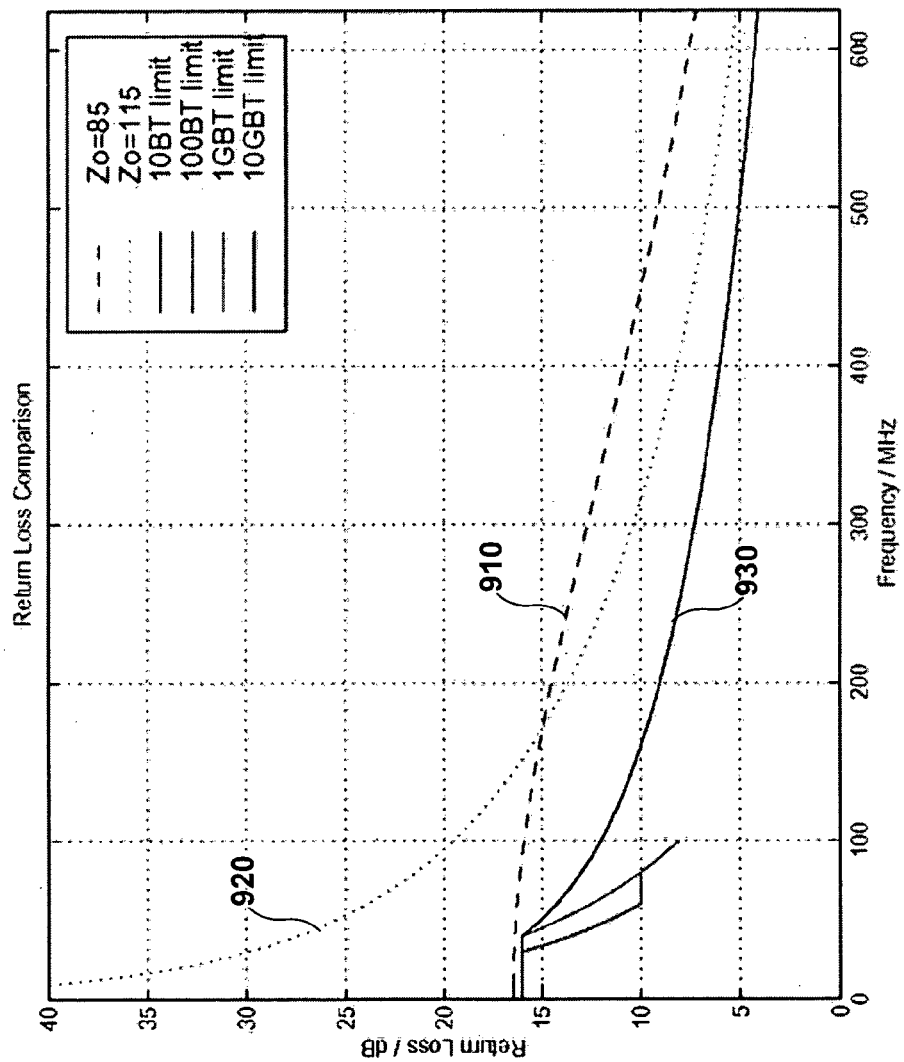
FIG. 12 is a graphical representation of the return loss of the communication system shown in FIG. 4 having a 115Ω untrimmed unsilicided poly termination resistor according to an embodiment of the present invention.

FIGS. 11 and 12 are respective graphical representations 1100 and 1200 of the return loss of communication system 400 shown in FIG. 4 with on-chip source termination 450 being an 85Ω or a 115Ω untrimmed unsilicided poly termination resistor, respectively, according to embodiments of the present invention. Resistances of 85Ω and 115Ω are used for illustrative purposes because the untrimmed unsilicided poly resistor can have a variation of ±15%. Such a variation can be tolerated by the return loss requirements of many technologies, such as 100-Tx, which requires a transmitter impedance variation of no more than ±15%. However, communication system 400 having on-chip source termination 450 with a tolerance of ±15% may not be capable of satisfying a more restrictive transmit amplitude accuracy requirement than ±15%. For instance, 100-Tx requires a transmit amplitude accuracy of ±5%.

On-chip source termination 450 can be adjusted to reduce the variation of the transmit amplitude of communication system 400. For example, an operational amplifier and/or a switching means can be used to manipulate the resistance of on-chip source termination 450. Multiple source terminations can be coupled in series or in parallel, such that one or more of the source terminations can be disconnected or shorted out using the switching means. The switching means can be a transistor or a switch, such as a programmable switch, to provide some examples.

2.2 Adjusting Source Termination

Figure 13:
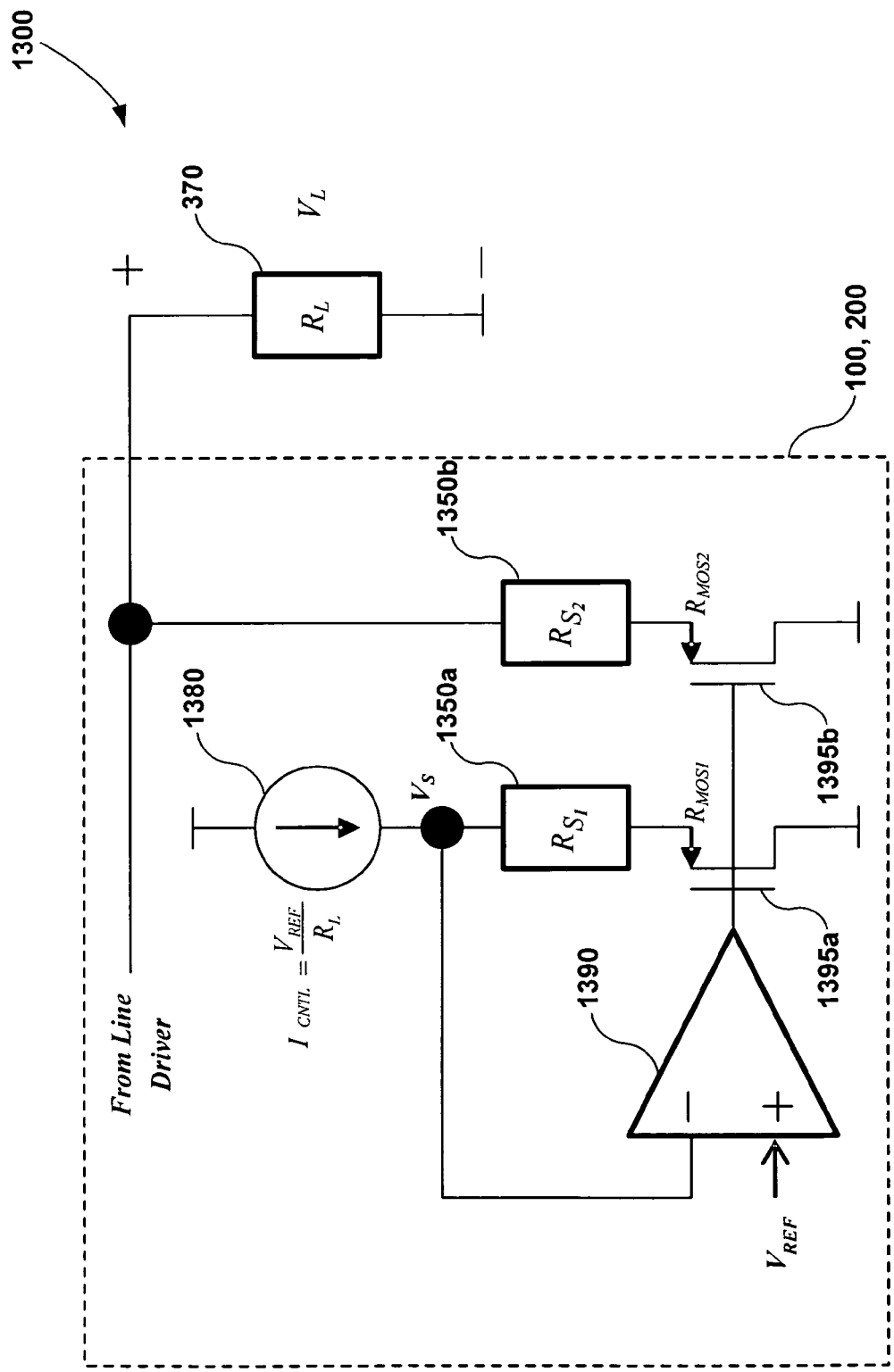
FIG. 13 is a schematic representation of an active source termination.

FIG. 13 is a schematic representation of an active source termination 1300. Active source termination 1300 includes first and second source terminations 1350a and 1350b, a current source 1380, an operational amplifier 1390, and first and second transistors 1395a and 1395b. Active source termination 1300 is connected to load 370 for illustrative purposes.

Operational amplifier 1390 receives a reference voltage ($V_{REF}$) at its positive input terminal and a voltage ($V_S$) at its negative input terminal. Operational amplifier 1390 amplifies the differential signal defined by the difference between $V_{REF}$ and $V_S$ to provide an output voltage to gates of first and second transistors 1395a and 1395b. Current source 1380 provides a current ($I_{CNTL}$) that sets a voltage across first source termination 1350a. Current $I_{CNTL}$ is proportional to $V_{REF}/R_L$.

Referring to FIG. 13, IC package 100, 200 includes a feedback network coupled between the negative input terminal of operational amplifier 1390 and a node labeled "$V_S$" between current source 1380 and first source termination 1350a. The feedback network of operational amplifier 1390, first transistor 1395a, and first source termination 1350a cause operational amplifier 1390 to drive first transistor 1395a and first source termination 1350a, so that the voltage $V_S$ is approximately equal to $V_{REF}$. The feedback network causes the combined impedance of first source termination 1350a and first transistor 1395a at $V_S$ to be equal to $V_{REF}$ divided by $I_{CNTL}$. This combined impedance is a direct function of the resistance $R_L$ of load 370. The feedback causes first transistor 1395a to operate in the triode region.

Second source termination 1350b and second transistor 1395b are scaled replicas of first source termination 1350a and first transistor 1395a. Because operational amplifier 1390 controls the gate of second transistor 1395b in the same manner as the gate of first transistor 1395a, the impedance of second transistor 1395a, operating in triode region, will be a scaled version of the impedance of first transistor 1395a. A scale factor is chosen, so that the combination of second source termination 1350b and second transistor 1395b provides a matched source resistance ($R_{SOURCE}$) to load 370.

The source resistance ($R_{SOURCE}$) of active source termination 1300 includes the resistance of both second source termination 1350b and second transistor 1395b (i.e., $R_{SOURCE}=R_{S2}+R_{MOS2}$). Adjusting $R_{MOS2}$ can improve the likelihood that $R_{SOURCE}$ is within an accuracy requirement of a technology. The size (e.g., gate width, gate length, number of gate fingers, etc.) of first and second transistors 1395a and 1395b can be based on the variation or potential variation of $R_{S1}$ and/or $R_{S2}$. The linearity or dynamic range of active source termination 1300 can be limited based on the voltage swing associated with second transistor 1395b.

Figure 14:
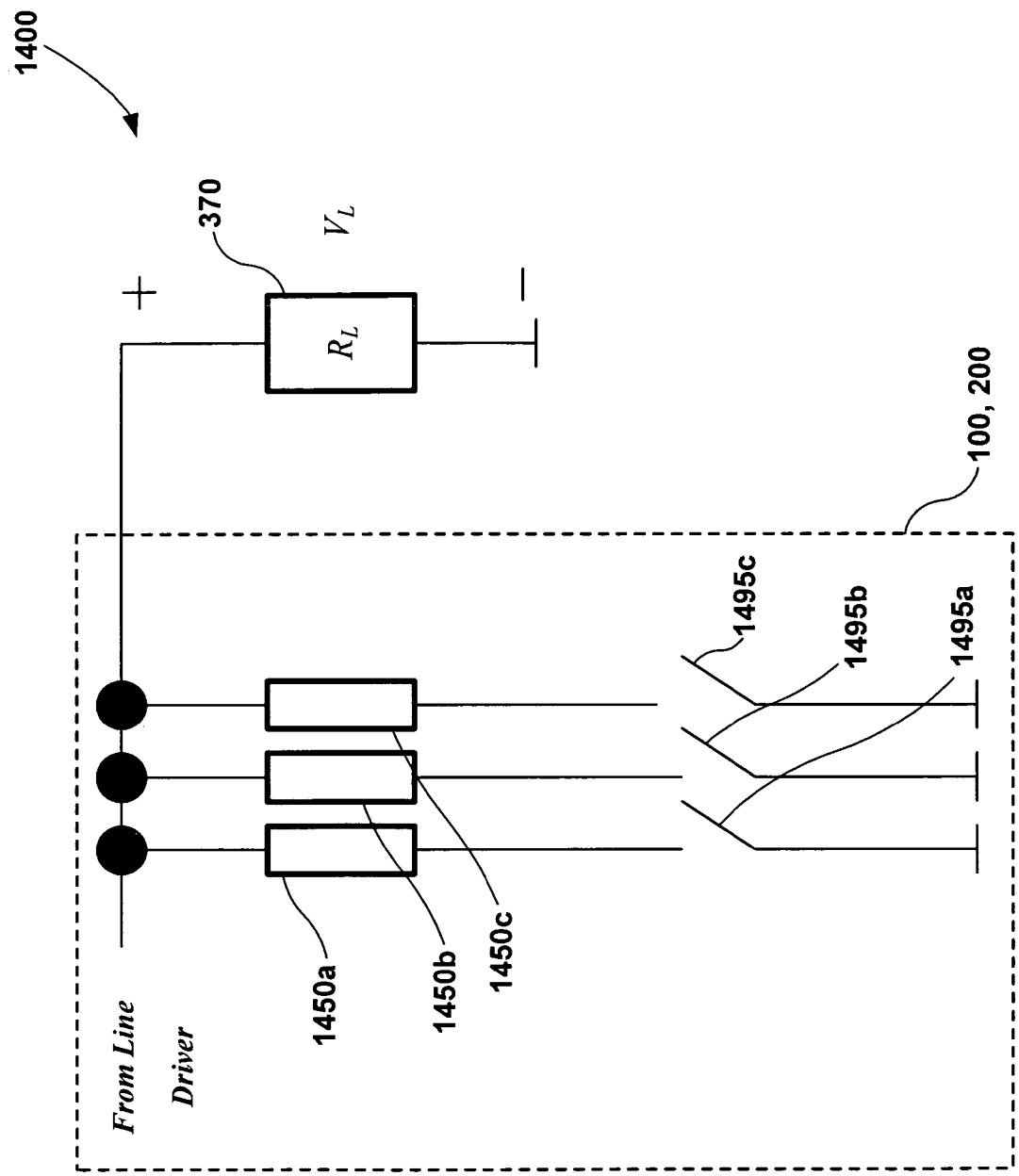
FIG. 14 is a schematic representation of a programmable source termination.

FIG. 14 is a schematic representation of a programmable source termination 1400. Programmable source termination 1400 includes first, second, and third source terminations 1450a-c and first, second, and third switches 1495a-c. Programmable source termination 1400 can include any number of source terminations 1450 and/or switches 1495. Programmable source termination 1400 is connected to load 370 for illustrative purposes.

Source terminations 1450 are connected in parallel with each other. Switches 1495 each have a first terminal and a second terminal. Each source termination 1450 is connected between line driver 320 of FIG. 3 and the first terminal of respective switch 1495. The second terminal of respective switch 1495 is connected to a reference potential, such as a ground potential. Switches 1495 can be independently opened and/or closed to provide a source resistance that satisfies a source resistance requirement or a transmit amplitude requirement associated with a technology.

Referring to FIG. 14, the ability of programmable source termination 1400 to compensate for different variations in the resistance of source terminations 1450 is based on the number of source terminations 1450 that are included in programmable source termination 1400. More source terminations 1450 allow programmable source termination 1400 to compensate for a wider variety of variations in the resistance of source terminations 1450.

Electrical properties of switches 1495 can affect the operation of programmable source termination 1400. For example, parasitics of switches 1495 can affect the bandwidth of source terminations 1450. In another example, switches 1495 that are enabled (i.e., turned on) can have a non-zero impedance across their terminals. This non-zero impedance can limit the linearity and/or dynamic range of programmable source termination 1400.

Figure 15:
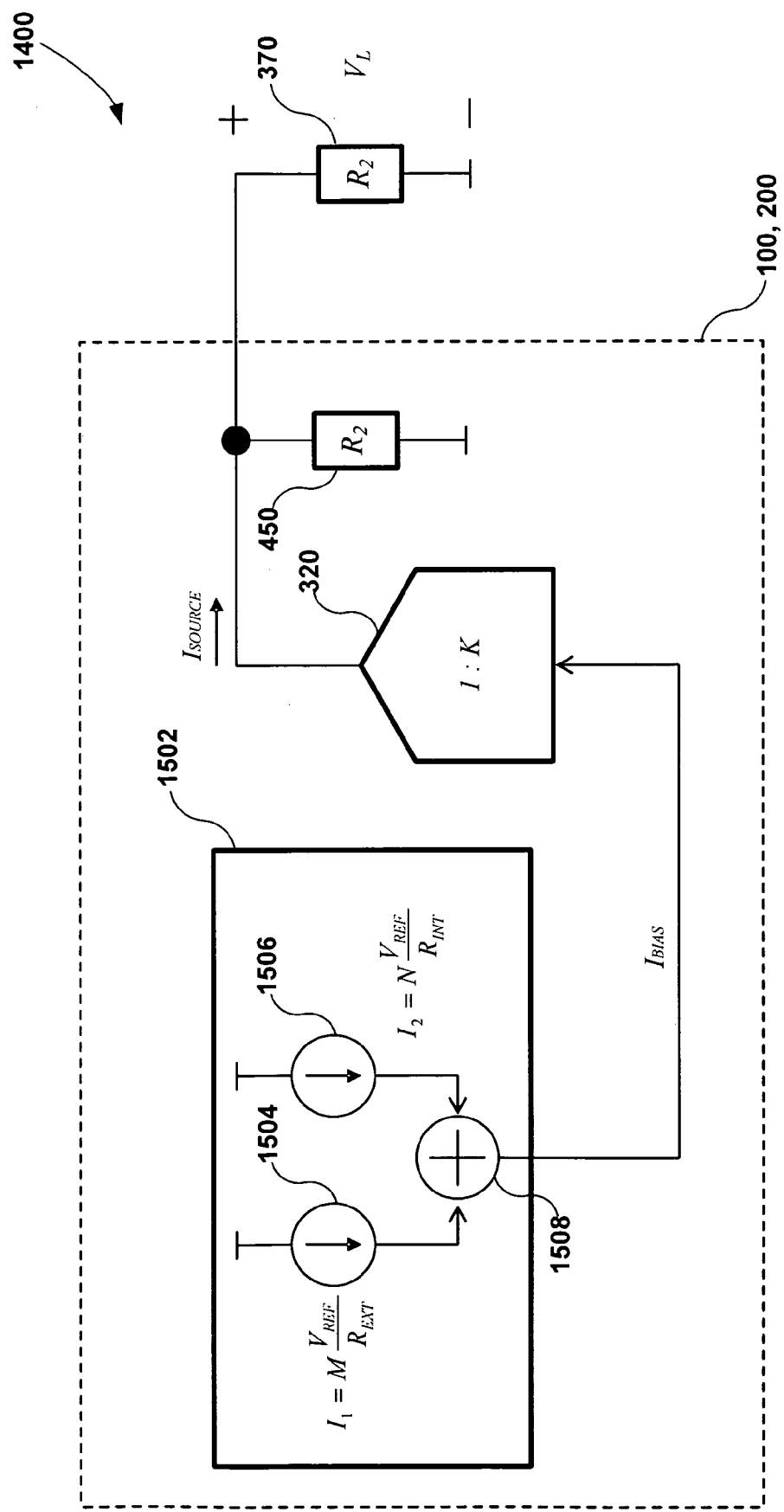
FIG. 15 is a schematic representation of a communication system including a bias generator according to an embodiment of the present invention.

FIG. 15 is a schematic representation of a communication system 1500 including a bias generator 1502 according to an embodiment of the present invention. Communication system 1500 further includes line driver 320 and on-chip source termination 450. Communication system 1500 is connected to load 370 for illustrative purposes.

Bias generator 1502 includes a first current source 1504 and a second current source 1506. First current source 1504 provides the first current $I_1$. Second current source 1506 provides the second current $I_2$. $I_1$ and $I_2$ are combined at element 1508 to provide the bias current, $I_{BIAS}$. For instance, element 1508 can be a node of the bias generator 1502.

In the embodiment of FIG. 15, bias generator 1502 includes two current sources 1504 and 1506 to allow $I_{BIAS}$, and thus $I_{SOURCE}$, to be adjusted off-chip and to provide a more stable transmit voltage $V_L$, as described in further detail below.

Line driver 320 amplifies $I_{BIAS}$ by a factor of K to provide the source current, $I_{SOURCE}=K \times I_{BIAS}$. $I_{SOURCE}$ can be adjusted by bias generator 1502 to achieve an accurate transmit voltage, rather than adjusting on-chip source termination 450. Not having to adjust on-chip source termination 450 can improve linearity, increase dynamic range, and/or improve bandwidth of communication system 1500, as compared to communication system 1300 or 1400. Communication system 1500 can have nine-bit, ten-bit, eleven-bit, or twelve-bit linearity, to provide some examples. Communication system 1500 can have at least 60 dB harmonic distortion. The bandwidth of communication system 1500 can be at least 500 MHz.

Communication system 1500 can satisfy a more restrictive transmit amplitude accuracy requirement than ±15% without requiring that on-chip source termination have a variation of less than ±15%. For instance, communication system 1500 can satisfy a transmit amplitude accuracy requirement of ±5%, even if the resistance of on-chip source termination 450 varies ±15%.

Figure 16:
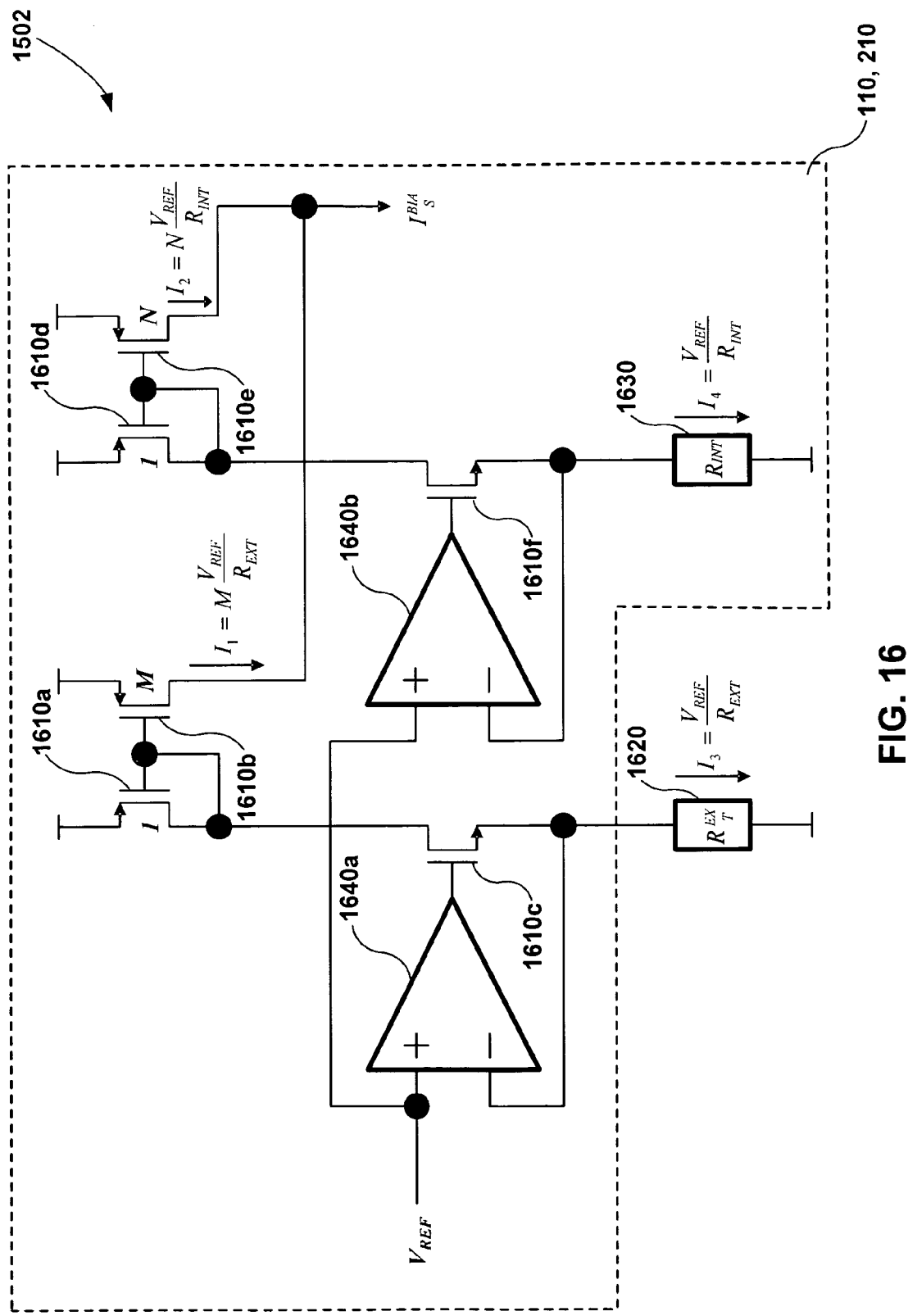
FIG. 16 is a schematic representation of the bias generator shown in FIG. 15 according to an embodiment of the present invention.

FIG. 16 is a schematic representation of bias generator 1502 shown in FIG. 15 according to an embodiment of the present invention. Bias generator 1502 includes transistors 1610a-f, an external resistor ($R_{EXT}$) 1620, an internal resistor ($R_{INT}$) 1630, and operational amplifiers 1640a and 1640b (hereinafter 1640).

Referring to FIG. 16, operational amplifier 1640a has a positive input terminal (+), a negative input terminal (−), and an output. Operational amplifier 1640a receives a reference voltage ($V_{REF}$) at its positive input terminal. Transistor 1610c has a gate, a source, and a drain. The gate of transistor 1610c is coupled to the output of operational amplifier 1640a. The source of transistor 1610c is coupled to the negative input terminal of operational amplifier 1640a and to external resistor 1620. As shown in FIG. 16, external resistor 1620 is not included in IC die 110, 210. Operational amplifier 1640a controls transistor 1610c so that the voltage at the negative input terminal (−) of operational amplifier 1640a is driven to $V_{REF}$. Therefore, the current $I_3$ that flows through external resistor 1620 may be represented by the equation $I_3=V_{REF}/R_{EXT}$.

The drain of transistor 1610c is coupled to a gate of transistor 1610a and a gate of transistor 1610b. Transistor 1610a is diode-connected, such that the gate of transistor 1610a and the drain of transistor 1610a are connected. Thus, in FIG. 16, the drain of transistor 1610c is connected to both the gate of transistor 1610a and the drain of transistor 1610a. The gate of transistor 1610a and the drain of transistor 1610a are at substantially the same voltage/potential. The sources of transistors 1610a and 1610b are coupled to a supply voltage.

The current $I_3$ that flows through external resistor 1620 also flows through transistor 1610a. The size of transistor 1610a is related to the size of transistor 1610b by a ratio of 1:M. First current source 1504 of FIG. 15 has an adjustable current gain equal to M. Accordingly, $I_1=M \times I_3=M \times V_{REF}/R_{EXT}$. M can be referred to as the first trim control, the trim control for $R_{EXT}$, or the external trim control.

In FIG. 16, operational amplifier 1640b has a positive input terminal (+), a negative input terminal (−), and an output. Operational amplifier 1640b receives a reference voltage ($V_{REF}$) at its positive input terminal. Transistor 1610f has a gate, a source, and a drain. The gate of transistor 1610f is coupled to the output of operational amplifier 1640b. The source of transistor 1610f is coupled to the negative input terminal of operational amplifier 1640b and to internal resistor 1630. As shown in FIG. 16, internal resistor 1630 is included in IC die 110, 210. Operational amplifier 1640b controls transistor 1610f so that the voltage at the negative input terminal (−) of operational amplifier 1640b is driven to $V_{REF}$. Therefore, the current $I_4$ that flows through internal resistor 1630 may be represented by the equation $I_4=V_{REF}/R_{INT}$.

The drain of transistor 1610f is coupled to a gate of transistor 1610d and a gate of transistor 1610e. Transistor 1610d is diode-connected, such that the gate of transistor 1610d and the drain of transistor 1610d are connected. thus, in FIG. 16, the drain of transistor 1610f is connected to both the gate of transistor 1610d and the drain of transistor 1610d. The gate of transistor 1610d and the drain of transistor 1610d are at substantially the same voltage/potential. The sources of transistors 1610d and 1610e are coupled to a supply voltage.

The current $I_4$ that flows through internal resistor 1630 also flows through transistor 1610d. The size of transistor 1610d is related to the size of transistor 1610e by a ratio of 1:N. Second current source 1506 of FIG. 15 has an adjustable current gain equal to N. Accordingly, $I_2=N \times I_4=N \times V_{REF}/R_{INT}$. N can be referred to as the second trim control, the trim control for $R_{INT}$, or the internal trim control.

$I_1$ and $I_2$ are combined in bias generator 1502 to provide $I_{BIAS}$, where $$I_{BIAS} = I_1 + I_2 = M \frac{V_{REF}}{R_{EXT}} + N \frac{V_{REF}}{R_{INT}} = \frac{M \cdot R_{INT} + N \cdot R_{EXT}}{R_{INT} \cdot R_{EXT}} \cdot V_{REF}.$$

In the embodiment of FIG. 16, bias generator 1502 is manufactured on-chip, except for external resistor 1620. IC die 110, 210 includes transistors 1610a-f, internal resistor 1630, and operational amplifiers 1640. For example, external resistor 1620 can be a discrete resistor that is coupled to an outer surface of IC die 110, 210. External resistor 1620 can have a more accurate resistance than internal resistor 1630. For instance, external resistor 1620 can have an accuracy of ±1%, and internal resistor 1630 can have an accuracy of ±15%.

Figure 17:
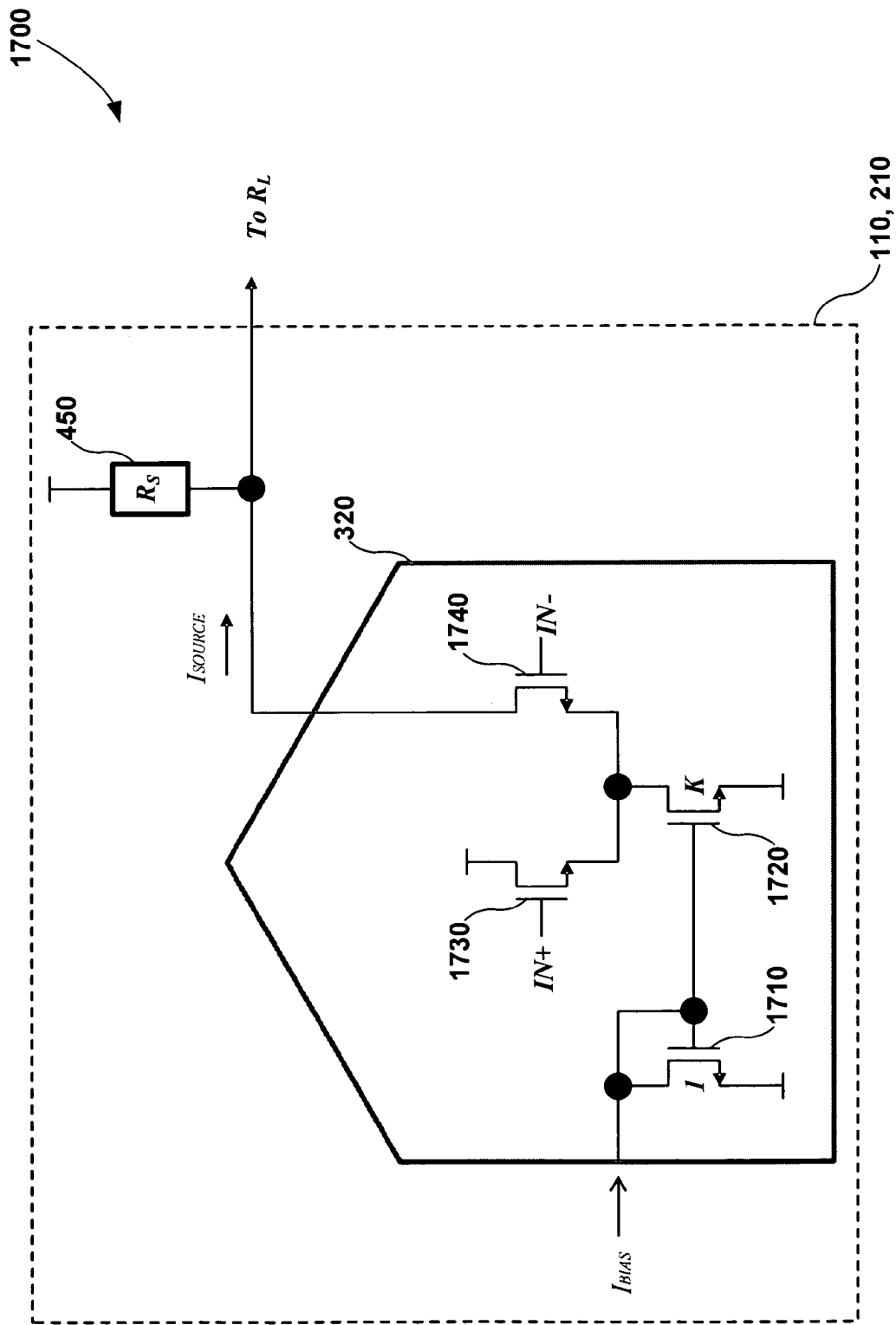
FIG. 17 is an example schematic representation of the line driver shown in FIG. 15 according to an embodiment of the present invention.

FIG. 17 is an example schematic representation 1700 of line driver 320 shown in FIG. 15 according to an embodiment of the present invention. However, schematic representation 1700 is provided for illustrative purposes and is not intended to limit the scope of the present invention. Line driver 320 may have any of a variety of configurations.

In FIG. 17, schematic representation 1700 shows the common mode portion of line driver 320 coupled to on-chip source termination 450. Line driver 320 includes a first transistor 1710, a second transistor 1720, a third transistor 1730, and a fourth transistor 1740. Transistors 1710, 1720, 1730, and 1740 each include a drain, a gate, and a source. The drain of first transistor 1710 receives $I_{BIAS}$ from bias generator 1502 of FIG. 15. The source of first transistor 1710 is coupled to a ground potential. First transistor 1710 is diode-connected, such that the drain and the gate of first transistor 1710 are electrically connected.

The gate of second transistor 1720 is coupled to the gate of first transistor 1710. The source of second transistor 1720 is coupled to the ground potential. The drain of second transistor 1720 is coupled to the source of third transistor 1730 and the source of fourth transistor 1740. A differential signal is provided between the gate of third transistor 1730 and the gate of fourth transistor 1740. The drain of third transistor 1730 can be connected to a supply voltage, though the scope of the invention is not limited in this respect. For instance, other circuitry can be connected to the drain of third transistor 1730. The drain of fourth transistor 1740 is connected to on-chip source termination 450 and load 370.

The size of first transistor 1710 is related to the size of second transistor 1720 by a ratio of 1:K. Line driver 320 has a current gain equal to K. Accordingly, $I_{SOURCE} = K \times I_{BIAS}$.

Referring to FIGS. 15-17, $R_{EXT}$ and $R_L$ are both external to IC die 110, 210. $R_{EXT}$ and $R_L$ track each other. For instance, a variation in the resistance of $R_{EXT}$ corresponds to a similar variation in the resistance of $R_L$, and vice versa. If $$\beta_{EXT} = \frac{R_L}{R_{EXT}},$$

$\beta_{EXT}$ can remain substantially constant in response to a variation in the resistance of $R_L$ and/or $R_{EXT}$.

$R_{INT}$ and $R_S$ are both included in IC die 110, 210. $R_{INT}$ and $R_S$ track each other. For instance, a variation in the resistance of $R_{INT}$ corresponds to a similar variation in the resistance of $R_S$, and vice versa. If $$\beta_{INT} = \frac{R_S}{R_{INT}},$$

$\beta_{INT}$ can remain substantially constant in response to a variation in the resistance of $R_{S\,1\,and/or\,RINT}$. Using the equations provided above for $\beta_{EXT}$ and $\beta_{INT}$, the voltage across load 370 can be calculated as follows.

$$\begin{aligned}
V_L &= I_{SOURCE} \cdot R_{OUT} \quad (1) \\
&= K \cdot I_{BIAS} \cdot (R_L \| R_S) \\
&= K \cdot \left( \frac{M \cdot R_{INT} + N \cdot R_{EXT}}{R_{INT} \cdot R_{EXT}} \right) \cdot \left( \frac{R_S \cdot R_L}{R_S + R_L} \right) \cdot V_{REF} \\
&= K \cdot (\beta_{INT} \cdot \beta_{EXT}) \cdot \left( \frac{M \cdot R_{INT} + N \cdot R_{EXT}}{\beta_{INT} \cdot R_{INT} + \beta_{EXT} \cdot R_{EXT}} \right) \cdot V_{REF}.
\end{aligned}$$

If $M \cdot \beta_{EXT} = N \cdot \beta_{INT}$, (2)

then $V_L = K \cdot M \cdot \beta_{EXT} \cdot V_{REF}$ (3)

$= K \cdot N \cdot \beta_{INT} \cdot V_{REF}$ (4)

Thus, a variation in the resistance of $R_L$, $R_{EXT}$, $R_S$, $R_{INT}$, or any combination thereof can have less of an impact on $V_L$ of communication system 1500, as compared to communication systems having conventional source terminations. For instance, $V_L$ can have substantially less variation than $R_L$, $R_{EXT}$, $R_S$, and $R_{INT}$.

$R_{EXT}$ and load ($R_L$) 370 can have a tolerance of ±1%. $R_{INT}$ and on-chip source termination ($R_S$) 450 can have a tolerance of ±15%. For example, $R_{INT}$ and $R_S$ can be unsilicided poly resistors. In this example, the ratio of the unsilicided poly resistors $R_{INT}$ and $R_S$ (i.e., $$\beta_{INT} = \frac{R_S}{R_{INT}})$$

can vary less than 5% in response to variations in the temperature and/or the process used to fabricate $R_{INT}$ and $R_S$. If first trim control M is adjusted to be approximately equal to second trim control N as provided in equation (2), then the transmit voltage $V_L$ in equations (3) and (4) does not depend on the absolute value of $R_{INT}$ or $R_S$. Instead, $V_L$ depends on the ratio $$\beta_{INT} = \frac{R_S}{R_{INT}}.$$

Figure 18:
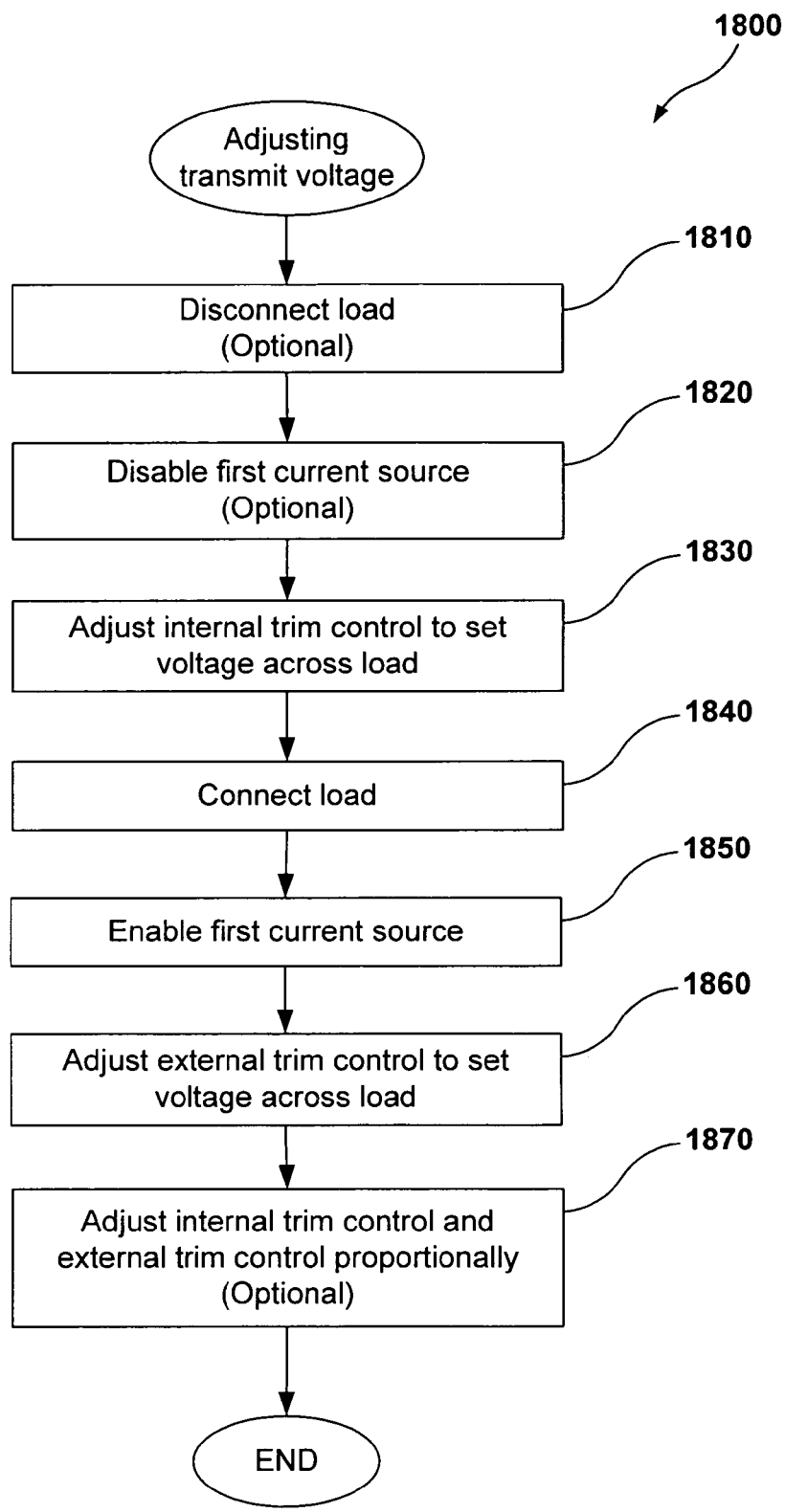
FIG. 18 is a flowchart of a method of adjusting a transmit voltage of an integrated circuit (IC) die according to an embodiment of the present invention.

FIG. 18 is a flowchart 1800 of a method of adjusting a transmit voltage of an integrated circuit (IC) die according to an embodiment of the present invention. The IC chip can be included in an IC package (e.g., IC package 100, 200) to provide some examples. The invention, however, is not limited to the description provided by flowchart 1800. Rather, it will be apparent to persons skilled in the relevant art(s) from the teachings provided herein that other functional flows are within the scope and spirit of the present invention.

Flowchart 1800 will be described with continued reference to example communication system 1500 described above in reference to FIGS. 15-17.

For instance, the method illustrated by flowchart 1800 can be used to adjust first trim control M of bias generator 1502 shown in FIGS. 15 and 16 to satisfy equation (2) provided above. The invention, however, is not limited to the embodiments of FIGS. 15-17.

Referring to FIG. 18, load 370 can be disconnected at step 1810 from IC die 110, 210, though load 370 need not necessarily be disconnected. For instance, load 370 may not initially be connected to IC die 110, 210. First current source 1504 can be disabled at step 1820, though first current source 1504 need not necessarily be disabled. For instance, first current source 1504 may not initially be enabled. Step(s) 1810 and/or 1820 can be performed by setting first trim control M to zero or by disconnecting $R_{EXT}$ from IC die 110, 210, to provide some examples.

Second trim control N is adjusted at step 1830 to set the output voltage ($V_{OUT}$) of IC die 110, 210. For example, N can be increased or decreased to adjust $V_{OUT}$ to a desired transmit voltage. Load 370 is connected at step 1840 to IC package 100, 200. First current source 1504 is enabled at step 1850.

Performing step(s) 1840 and/or 1850 can cause $V_{OUT}$ to shift from the desired transmit voltage. First trim control M is adjusted at step 1860 to adjust $V_{OUT}$. For instance, M can be increased or decreased to re-adjust $V_{OUT}$ to the desired transmit voltage. First trim control M and second trim control N can be adjusted proportionally at step 1870. For example, $V_{OUT}$ can be further adjusted by changing both M and N proportionally.

M and/or N can be adjusted using fuses, for example. Adjusting M or N does not adjust load 370. Instead, adjusting M or N adjusts the bias of IC die 110, 210. The signal bandwidth and/or the signal quality of IC die 110, 210 or communication system 1500 may not be negatively affected by adjusting M or N.

The method illustrated by flowchart 1800 can allow the transmit amplitude (i.e., the amplitude of $V_{OUT}$) to be adjusted over a wide range, while maintaining a high transmit amplitude accuracy. $V_{OUT}$ may not be sensitive to a variation in temperature, a voltage provided to IC die 110, 210, or the process used to fabricate on-chip source termination 450, to provide some examples. The method can provide superior linearity, dynamic range, and/or bandwidth characteristics, as compared to methods that involve having an active circuit or a programmable switch in the source termination. The method is applicable to high-speed and/or high-precision transceivers/transmitters, though the scope of the present invention is not limited in this respect. The method is applicable to a variety of technologies, such as 1 gigabit Ethernet or 10 gigabit Ethernet over unshielded twisted pair (UTP) cable, for example. Persons skilled in the relevant art(s) will recognize that the method is applicable to any suitable communication system.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A method of adjusting an output voltage of an integrated circuit (IC) die having a first current source coupled to an on-chip resistor and a second current source coupled to an off-chip resistor, the method comprising:
    adjusting a current gain of the first current source to set the output voltage of the IC die;
    coupling a load to the IC die;
    enabling the second current source;
    summing a first current from the first current source and a second current from the second current source; and
    adjusting a current gain of the second current source in response to a shift in output voltage of the IC die.

2. The method of claim 1, further comprising disconnecting the load from the IC die, wherein adjusting the current gain of the first current source is performed in response to disconnecting the load.

3. The method of claim 1, further comprising disabling the second current source, wherein adjusting the current gain of the first current source is performed in response to disabling the second current source.

4. The method of claim 3, wherein disabling the second current source comprises setting the current gain of the second current source to approximately zero.

5. The method of claim 3, wherein disabling the second current source comprises disconnecting the off-chip resistor from the IC die.

6. The method of claim 1, further comprising adjusting the current gain of the first current source and the current gain of the second current source proportionally in response to adjusting the current gain of the second current source to set the output voltage of the IC die.

7. The method of claim 1, wherein summing the first current and the second current comprises:
    combining the first current from the first current source and the second current from the second current source to provide a bias current to a line driver of the IC die; and
    amplifying the bias current using the line driver to provide a source current to an output load of the IC die.

8. The method of claim 7, wherein combining the first current and the second current comprises:
    controlling a first transistor of the first current source using a first operational amplifier; and
    controlling a second transistor of the second current source using a second operational amplifier.

9. The method of claim 8, wherein adjusting the trim control of the off-chip resistor comprises setting the output voltage in accordance with equation $V_{OUT}=K \cdot M \cdot \beta_{EXT} \cdot V_{REF} = K \cdot N \cdot \beta_{INT} \cdot V_{REF}$, wherein K is a current gain of the line driver, M is the trim control of the off-chip resistor, N is the trim control of the on-chip resistor, $\beta_{EXT}$ equals a resistance of the load divided by a resistance of the off-chip resistor, $\beta_{INT}$ equals a resistance of an on-chip source termination of the IC die divided by a resistance of the on-chip resistor, and $V_{REF}$ is a reference voltage provided to the first operational amplifier and the second operational amplifier.

10. The method of claim 1, wherein adjusting the current gain of the second current source comprises at least one of increasing a current delivered to the load of the IC die and decreasing the current delivered to the load of the IC die, thereby shifting the output voltage of the IC die to a desired output voltage.

11. The method of claim 10, wherein increasing the current delivered to the load comprises raising the output voltage of the IC die.

12. The method of claim 10, wherein decreasing the current delivered to the load comprises lowering the output voltage of the IC die.

* * * * *